(12) United States Patent
Slaughter et al.

(10) Patent No.: US 6,594,708 B1
(45) Date of Patent: Jul. 15, 2003

(54) APPARATUS AND METHOD FOR OBJECT-ORIENTED MEMORY SYSTEM

(75) Inventors: Gregory K. Slaughter, Palo Alto, CA (US); Thomas Saulpaugh, San Jose, CA (US); Sunil K. Bopardikar, Sunnyvale, CA (US); Zi-Hui Li, Mt. View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/048,333

(22) Filed: Mar. 26, 1998

(51) Int. Cl.⁷ .................................................. G06F 9/44
(52) U.S. Cl. ...................................... 709/315; 711/170
(58) Field of Search .................................. 709/315, 316, 709/310; 711/170

(56) References Cited

U.S. PATENT DOCUMENTS

| | | |
|---|---|---|
| 4,173,783 A | 11/1979 | Couleur et al. |
| 4,533,996 A | 8/1985 | Hartung et al. |
| 5,291,585 A | 3/1994 | Sato et al. |
| 5,309,563 A | 5/1994 | Farrand et al. |
| 5,335,320 A | 8/1994 | Iwata et al. |
| 5,345,550 A | 9/1994 | Bloomfield |
| 5,347,627 A | 9/1994 | Hoffmann et al. |
| 5,384,911 A | 1/1995 | Bloomfield |

(List continued on next page.)

FOREIGN PATENT DOCUMENTS

| | | | |
|---|---|---|---|
| EP | 0737917 | 10/1996 | |
| EP | 0953899 A2 * | 3/1999 | ............. G06F/9/44 |
| WO | WO97/44739 | 11/1997 | |

OTHER PUBLICATIONS

Sun. "JavaOS for Business IBM". Device Driver Guide. Jun. 1998.*
Sun. "JavaOS for Business IBM". Reference Manual. Jun. 1998.*
Sun. "JavaOS: A Standalone Java Environment, A White Paper". May 1996.*
Greenspon, Michael C. "Ring Array Processor". Sep. 1992.*
Jaworski, Jamie. "Java Developer's Guide." Part I, Introduction to Java. Jun. 1996, p. 4–10.*
Ronald L. Johnston, "The Dynamic Incremental Compiler of APL/3000" Proceedings of the API '79 Conference, published as APL Quote Quad, 9(4), p 82–87.
Leo J. Guibas et al., "Compilation and Delayed Evaluation in APL," Fifth Annual Synposium on Principles in Programming Languages, p 1–8, 1978.
Gleen Krasner "The Smalltalk–80 Virtual Machine" BYTE Publications Inc., Aug. 1991, pp 300–320.

(List continued on next page.)

Primary Examiner—St. John Courtenay, III
Assistant Examiner—Lewis A. Bullock, Jr.
(74) Attorney, Agent, or Firm—Beyer Weaver & Thomas, LLP

(57) ABSTRACT

A method and apparatus for providing memory functionality to object-oriented client software components of a computer system having a CPU using a first set of memory classes, each class of the first set being platform-independent; a second set of memory classes, each class of the second set being a subclass of a class of the first set and being platform-dependent; and performing client component memory functions by accessing only objects of classes of the first set. Descriptions of the classes and methods are provided, enabling platform-independent device drivers to be implemented.

16 Claims, 3 Drawing Sheets

U.S. PATENT DOCUMENTS

| | | | |
|---|---|---|---|
| 5,404,494 | A | 4/1995 | Garney |
| 5,412,772 | A | 5/1995 | Monson |
| 5,414,806 | A | 5/1995 | Richards |
| 5,423,034 | A | 6/1995 | Cohen-Levy et al. |
| 5,430,836 | A | 7/1995 | Wolf et al. |
| 5,436,637 | A | 7/1995 | Gayraud et al. |
| 5,448,695 | A | 9/1995 | Douglas et al. |
| 5,461,399 | A | 10/1995 | Cragun |
| 5,461,710 | A | 10/1995 | Bloomfiled et al. |
| 5,473,745 | A | 12/1995 | Berry et al. |
| 5,473,777 | A | 12/1995 | Moeller et al. |
| 5,491,784 | A | 2/1996 | Douglas et al. |
| 5,493,638 | A | 2/1996 | Hooper et al. |
| 5,509,116 | A | 4/1996 | Hiraga et al. |
| 5,526,517 | A | 6/1996 | Jones et al. |
| 5,544,288 | A | 8/1996 | Morgan et al. |
| 5,546,519 | A | 8/1996 | Berry |
| 5,548,702 | A | 8/1996 | Li et al. |
| 5,550,968 | A | 8/1996 | Miller et al. |
| 5,559,942 | A | 9/1996 | Gough et al. |
| 5,564,003 | A | 10/1996 | Bell et al. |
| 5,566,330 | A | 10/1996 | Sheffield |
| 5,570,462 | A | 10/1996 | McFarland |
| 5,572,643 | A | 11/1996 | Judson |
| 5,694,603 | A | 12/1997 | Reiffin |
| 5,694,604 | A | 12/1997 | Reiffin |
| 5,701,476 | A | 12/1997 | Fenger |
| 5,701,483 | A | 12/1997 | Pun |
| 5,752,032 | A | 5/1998 | Keller et al. |
| 5,790,887 | A | 8/1998 | Brech |
| 5,829,053 | A | 10/1998 | Smith et al. |
| 5,860,079 | A | 1/1999 | Smith et al. |
| 5,867,690 | A | 2/1999 | Lee et al. |
| 5,898,896 | A | 4/1999 | Kaiser et al. |
| 5,937,170 | A | 8/1999 | Bedarida |
| 5,968,136 | A | 10/1999 | Saulpaugh et al. |
| 6,016,503 | A | 1/2000 | Overby, Jr. et al. |
| 6,052,739 | A * | 4/2000 | Bopardikar et al. ........ 709/321 |
| 6,202,147 | B1 * | 3/2001 | Slaughter et al. .............. 713/1 |

OTHER PUBLICATIONS

Panagiotis Kougiouris, "A Device Management Framework for an Object–Oriented Operating System", May 1991, Report of Department of Computer Science University of Illinois at Urbana–Champaign.

Guibas et al., "Compilation and Delayed Evaluation in APL", 1978, Fifth Annual ACM Synposium on Principles of Programming Languages, p. 1–8.

Ronald L. Johnston, "The Dynamic Incremental Compiler of APL/3000", 1979, Proceedings of the APL '79 Conference, published as APL Quote Quad, 9(4), p. 82–87.

Panagiotis Kougiouris, "A Device Management Framework for an Object–Oriented Operating System", May 1991, Report of Department of Computer Science University of Illinois at Urbana–Champaign.

Glenn Krasner, "The Smalltalk–80 Virtual Machine", Aug. 1981, BYTE Publications Inc., p. 300–320 (even pages only).

Lemon et al., "An Object Oriented Device Driver Model", 1995, IEEE, p. 360–366.

Edward Tuggle, "Advanced Topics In Device Driver Design," Proceedings of the Annual Embedded Systems Conference, p. 437–454.

* cited by examiner

APPARATUS AND METHOD FOR OBJECT-ORIENTED MEMORY SYSTEM

BACKGROUND OF THE INVENTION

1. Field of the Invention

The invention relates generally to computer memory and, more particularly, to memory methods and systems which are platform-independent.

2. Description of the Related Art

In order for computer systems to communicate with the user, the systems usually include a number of peripheral devices such as display screen, printers, and keyboards. Each of these peripheral devices requires a special software component, called a device driver, to provide for orderly exchange of data between the peripheral device and the rest of the computer system.

A company developing, for example, a new color printer would like to insure that the printer will be usable with computers having different hardware configurations ("platforms"), including systems based upon the most popular types of central processing units, such as the SPARC manufactured by Sun Microsystems, the PowerPC manufactured by the Motorola Corporation, and the Pentium manufactured by Intel Corporation. Currently, this requires that the printer manufacturer write a separate device driver for each platform, thereby driving up the development cost of the printer. Moreover, the need for custom device drivers for each platform also means that when a new platform is introduced, device drivers may not be immediately available for the most popular types of peripheral devices.

The need for custom device drivers for each platform is closely related to the varying memory characteristics of each platform. It would be desirable to provide memory systems and methods which would permit a single device driver to be written for a peripheral device, thereby allowing operation of the peripheral device on all platforms, including new platforms to be introduced in the future.

SUMMARY OF THE INVENTION

Features and advantages of the invention will be set forth in the description which follows, and in part will be apparent from the description, or may be learned by practice of the invention. The objectives and other advantages of the invention will be realized and attained by the apparatus, methods, and articles of manufacture particularly pointed out in the written description and claims hereof, as well as the appended drawings.

To achieve these and other advantages, and in accordance with the purpose of the invention as embodied and broadly described, the invention provides a method for providing memory functionality to object-oriented client software components of a computer system having a CPU. The method comprising the steps of providing a first set of memory classes, each class of the first set being platform-independent; providing a second set of memory classes, each class of the second set being a subclass of a class of the first set and being platform-dependent; and performing client component memory functions by accessing only objects of classes of the first set.

In another aspect, the invention includes apparatus for performing memory functions in an object-oriented computer system, comprising a first set of memory classes, each class of the first set being platform-independent; a second set of memory classes, each class of the second set being a subclass of a class of the first set and being platform-dependent; a device driver accessing only objects of classes of the first set; and a bus manager accessing classes of the second set.

In yet another aspect, the invention includes a computer-readable medium containing instructions for providing memory functionality to object-oriented client software components of a computer system having a CPU. The instructions comprise a first set of memory classes, each class of the first set being platform-independent; and a second set of memory classes, each class of the second set being a subclass of a class of the first set and being platform-dependent.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one/several embodiment(s) of the invention and, together with the description, serve to explain the principles of the invention.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE PREFERRED EMBODIMENTS

Figure 1:
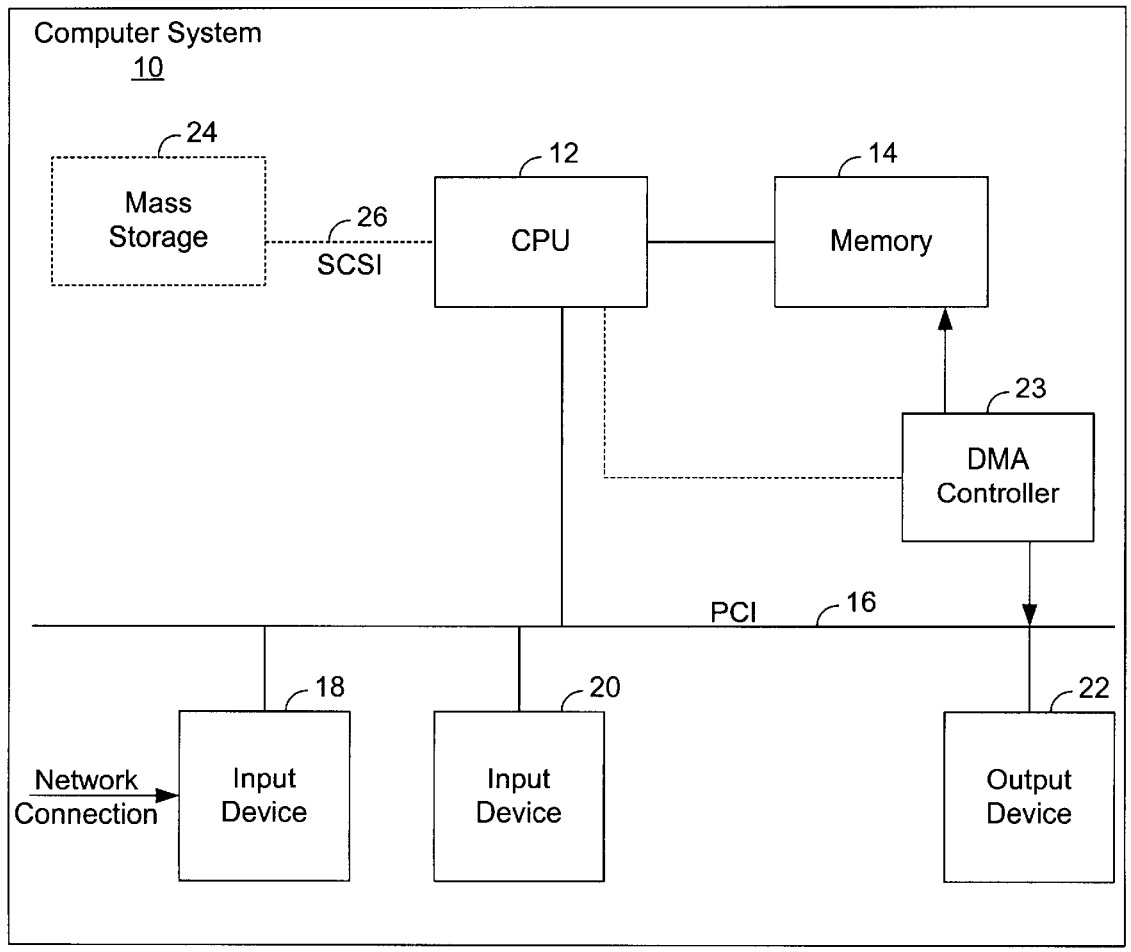
FIG. 1 is a hardware block diagram of a computer system embodying the present invention.

Methods and apparatus consistent with the present invention are contained in an object-oriented operating system. The disclosed embodiment is implemented in the Java programming environment provided by Sun Microsystems, Inc. of Mountain View, Calif. However, the invention is not so limited and may be incorporated into other computer systems, other operating systems, and other programming environments, as is understood by those skilled in the art. Java, Java-related trademarks, Sun, Sun Microsystems, and the Sun logo are either trademarks or registered trademarks of Sun Microsystems, Inc. of Mountain View, Calif.

Reference will now be made in detail to an implementation consistent with the present invention, as illustrated in the drawings. Wherever possible, the same reference numbers will be used throughout the drawings and the following description to refer to the same or like parts.

FIG. 1 shows a computer system 10 which includes the present invention. Computer system 10 includes a central processing unit (CPU) 12 which may be, for example, a Sun SPARC, a Motorola Power PC or an Intel Pentium. Computer system 10 may represent a wide variety of computing devices. For example, system 10 may represent a standard personal computer, as widely used in homes and offices. Alternatively, system 10 may comprise a much more specialized "smart" system, such as a set-top box for use in receiving high definition television, or a multi-function cellular telephone.

CPU 12 is connected to memory 14 which may include various types of memory such as random access memory (RAM) and read only memory (ROM). CPU 12 is also connected to an expansion bus 16 which may be, for example, a PCI bus. Various types of input and output devices 18, 20, and 22 are connected to bus 16. For example, input device 18 may be a modem or network interface card connecting system 10 to a telephone line or local area network. Input device 20 may be, for example, a keyboard and output device 22 may be, for example, a printer. System 10 may optionally include a mass storage device 24, such as a hard disk drive connected by an I/O bus 26 which may be, for example, a SCSI bus. System 10 also includes a direct memory access (DMA) controller 23, under control of CPU 12, which can provide direct transfer of data between memory 14 and PCI bus 16.

Figure 2:
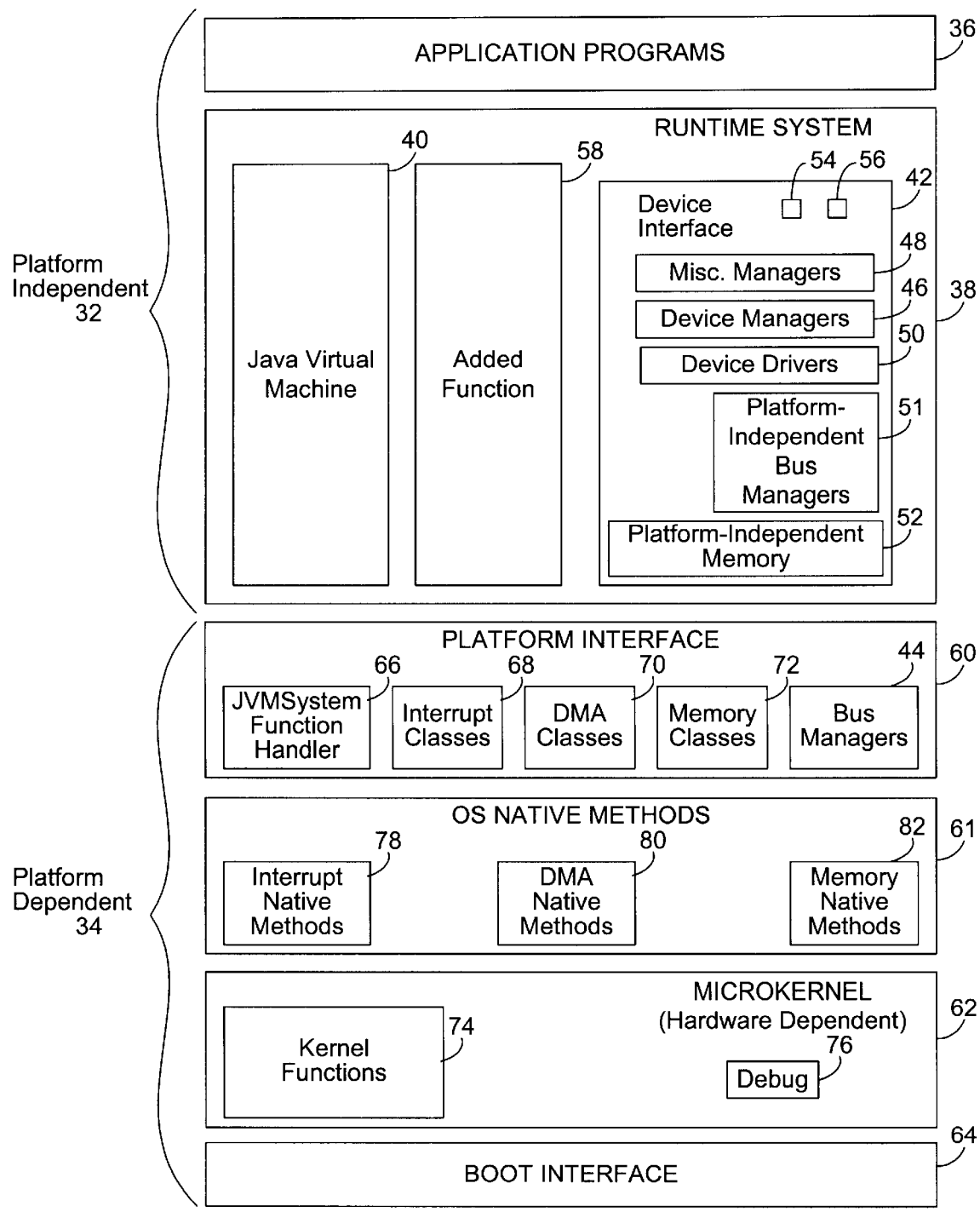
FIG. 2 is a diagram of object-oriented software of the computer system of FIG. 1.

Referring now to FIG. 2, there is shown a diagram of software stored in memory 14 of FIG. 1. FIG. 2 shows software logically arranged in a series of layers. An upper layer 32 is "platform-independent." The term "platform" generally refers to a CPU, physical memory, and permanently attached devices and buses. Thus, the software contained in platform-independent layer 32 is written in a manner that it may be used with any platform, based on any CPU, either existing or to be developed in the future, without modification. A second layer 34 is platform-dependent. Thus, software of layer 34 must be customized for the particular platform of computer system 10.

Platform-independent layer 32 includes an application program layer 36 which performs specific operations for the user, such as desktop publishing, managing a telephone call, or database management. Application layer 36 interfaces with a runtime system 38 which includes a component known as a "Java™ Virtual Machine" (JVM). The JVM is a software component which receives instructions in the form of machine-independent bytecodes produced by applications programs and interprets the instructions by dynamically converting and executing them. The JVM interfaces with a specific platform to execute desired functions. The disclosed embodiment employs a Java Virtual Machine, but other types of virtual machines are usable, as known to those skilled in the art. The operation of the JVM is well known to those skilled in the art and is discussed in, for example, the book Java! by Tim Ritchey, published by New Riders Publishing of Indianapolis, Ind., and in *The Java Virtual Machine Specification*, by Lindham and Yellin, Addison-Wellesley (1997).

Runtime system 38 also includes a device interface portion 42 which supports operation of devices such as buses 16 and 26 and devices 18, 20, 22 (FIG. 1). In particular, device interface 42 includes device mangers 46 and miscellaneous managers 48. Device interface 42 also includes device drivers 50 which are object-oriented programs written for each of the devices 18, 20, and 22. Note that device drivers 50 are included in platform-independent layer 32, and thus, once written, may be used to support devices 18, 20, and 22 on any platform both existing and to be developed in the future. Similarly, device interface 42 includes platform-independent bus managers 51 which are object-oriented programs written for buses, such as PCI bus 16 and SCSI bus 26 of FIG. 1. Device interface 42 also includes platform-independent memory 52 which form part of the present invention and will be discussed below in greater detail.

Device interface 42 also includes additional components such as a system database 56 and a system loader 54 which support operation of computer system 10. Similarly, runtime layer 38 includes additional functions 58 supporting operations such as input/output, network operations, graphics, printing, multimedia, etc.

Platform-dependent layer 34 includes a platform interface 60, an OS native methods layer 61, a microkernel 62, and a boot interface 64. Platform interface 60 includes virtual machine system function library handlers 66 which may be written in the Java programming language to provide support for system function calls received from virtual machine 40. Platform interface 60 further includes interrupt classes 68 also written in the Java programming language which support interrupt operations of computer system 10 and bus managers 44. Finally, platform interface 60 includes direct memory access (DMA) classes 70 and memory classes 72, each written in the Java programming language. DMA classes 70 and memory classes 72 are a feature of the present invention and will be discussed below in greater detail.

OS native methods layer 61 includes operating system methods of classes 68, 70, 72, and 44 which are written in a language specific to CPU 12 ("native" language) and which interface with lower-level operations of microkernel 62. These methods include interrupt native methods 78, DMA native methods 80, and memory native methods 82. Methods 80 and 82 will be discussed below in greater detail.

Microkernel 62 consists of native-language software components which support essential low-level hardware functions of CPU 12, such as resource allocation, interrupt process, security, etc. In particular, microkernel 62 includes a plurality of kernel functions 74 including thread management, exceptions, timing, physical memory management, hardware interrupt processing, platform control, process management, library management, I/O support, and monitor functions. Microkernel 62 further includes debug functions 76. Functions 74 and 76 may be performed by the Chorus microkernel commercially available from Sun Microsystems. However, other microkernels may be used, as is known to those skilled in the art.

The final component of platform-dependent layer 34 is boot interface 64. Boot interface 64 provides for loading and initialization of software into memory 14 (FIG. 1) when computer system 10 is initially powered up. Boot interface 64 may load software stored on, for example, a floppy disk, mass storage 24 (FIG. 1), or software received in the form of a computer data carrier wave over a network, via input device 18. Boot interface 64 forms no part of the present invention and will not be discussed in further detail.

Figure 3:
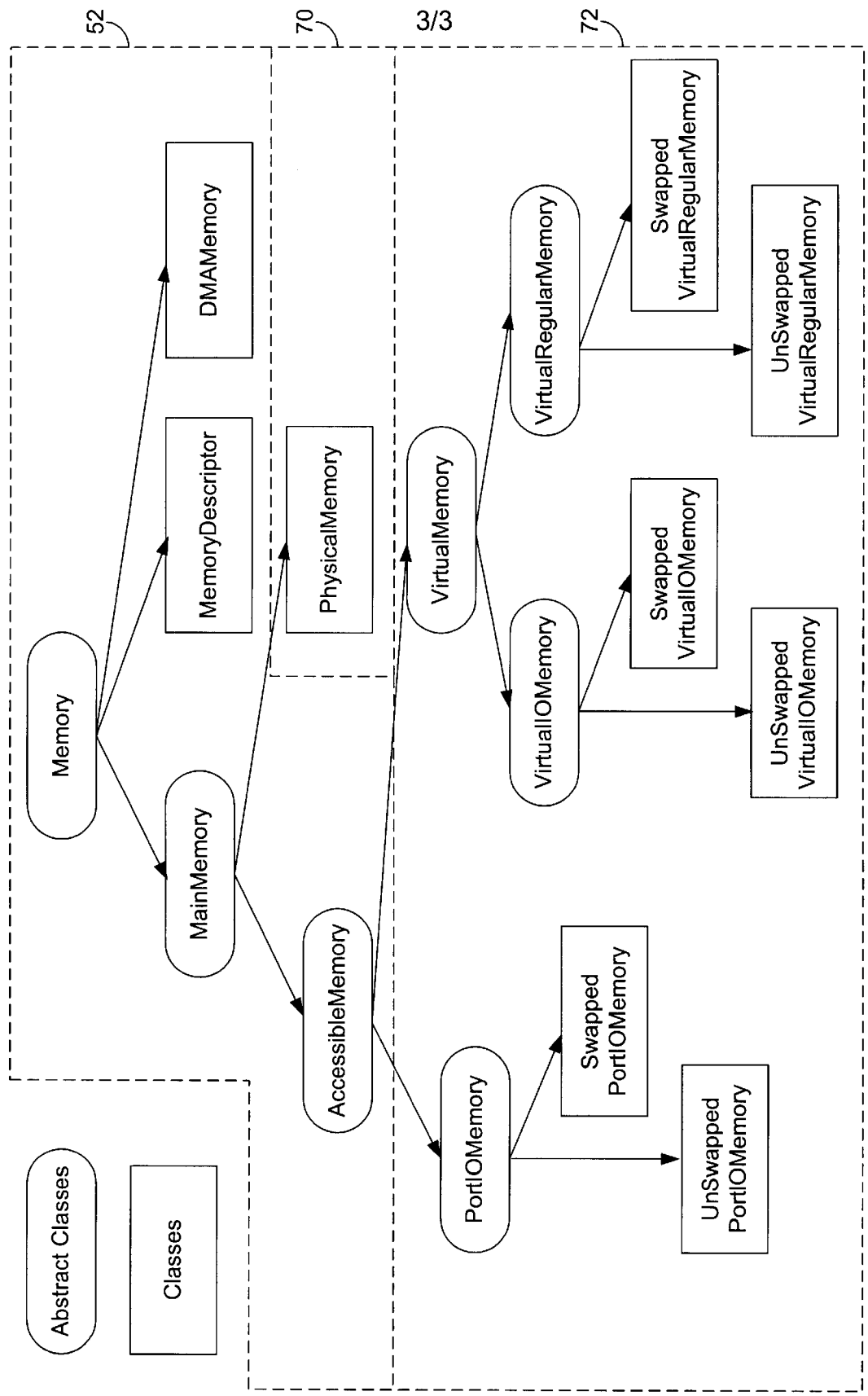
FIG. 3 is a diagram showing the class hierarchy of the memory system portion of the software shown in FIG. 2.

Referring now to FIG. 3, there is shown a diagram illustrating the hierarchy of memory and DMA classes 52, 70, and 72. Memory and DMA Classes 52, 70, and 72 have the following design goals:

One platform-independent class for client software components, such as drivers, to access (read or write) memory: Although there could be a variety of different types of platforms supported, a driver will always use the same platform-independent methods of these classes, and only these methods, to read and write memory. Developing device drivers written in the Java programming language, which are completely independent of the particular platform, is one of the main goals of the present invention.

Methods for Bus Managers to Construct memory objects: the present invention encapsulates device platform specifics in a handful of bus managers which construct memory objects for the vast array of device drivers to use to access memory. The Memory classes allow a bus manager to construct a generic memory object, which ultimately provides access to one of three (as specified by the bus manager) fundamental types of memory:

Regular memory which is accessed via normal load and store operations from the CPU. This memory could be directly addressed by the CPU (i.e., physical memory), or could be indirectly accessed through an MMU (i.e. virtual memory).

I/O memory which is accessed via normal load and store operations from the CPU, but which may also require other operations to be done to keep the I/O memory coherent with main memory. Again, this memory could be directly addressed by the CPU (i.e. physical memory), or could be indirectly accessed through an MMU (i.e. virtual memory).

I/O port memory which is accessed via special I/0 instructions (e.g. in and out instructions on Intel x86-based platforms).

Methods for the Bus Managers to set up DMA on behalf of client drivers.

Platform independence of the Java programming language portions of the Memory and DMA classes themselves.

Support for virtual memory and multiple address spaces. Furthermore, the virtual memory supported has to be sufficiently general to include platforms that have no MMU. In such cases, virtual address will be the same as physical address, and only one virtual address space will be provided by the platform. Device drivers will always think they are accessing virtual memory, even on systems with no MMU and only one virtual address space, even though they are accessing physical memory directly.

A sufficiently rich memory model.

A generic interface to a microkernel, via native methods, as shown in FIG. 2. The new Memory and DMA classes are designed to interface with a generic microkernel.

It is important to note in particular that the Memory and DMA classes do not provide yet another OS memory management subsystem implementation. Rather, the functionality for managing virtual memory, physical memory, I/O memory, and DMA is provided by the microkernel. The Memory and DMA classes do call upon such microkernel functionality via native methods, but these classes leverage that functionality, rather than reinventing it.

More detailed discussion of the classes shown in FIG. 3 is set forth below.

Memory Abstract Class

At the highest level, each of the Memory and DMA classes is eventually a sub-class of the Memory abstract class, which only has the notion of such general attributes as a base address, length, and constraints (of both access and allocation). Below that, memory is either ultimately accessible (perhaps not always directly, as in the case of physical memory) by a CPU, hence MainMemory, or it is accessed externally to the CPUs via DMA, hence DMAMemory.

MemoryDescriptor Class

Having a non-abstract and hence instantiable sub-class of Memory proves useful for representing fundamental characteristics of memory, such as base address and length, before an actual memory object has been constructed. Other than being instantiable, the MemoryDescriptor class does not provide any additional functionality beyond that provided by Memory. This is useful for bus managers to represent abstract memory before it is actually allocated.

MainMemory Abstract Class

The MainMemory abstract class only specifies abstract methods for managing caching, which is the only functionality common to its sub-classes. Eventually in the hierarchy (in PhysicalMemory, VirtualMemory, and PortIOMemory), these abstract cache management methods are implemented. It is important to note that cache management is highly platform-dependent, and thus each of these implementations ultimately relies on invoking the microkernel to flush caches, set the cache mode, etc. Therefore, the device driver has full access to complete cache functions using platform-independent methods of MainMemory. MainMemory is either the abstract class, AccessibleMemory, which represents all memory that can be directly accessed by a CPU, or it is the PhysicalMemory class, which represents physical memory, which in general may not always be directly accessed by a CPU.

DMAMemory Class

The DMAMemory class provides methods for setting up DMA mappings to physical memory (ultimately done by the microkernel running below these classes), and for doing the corresponding unmapping. The decision was made to have the microkernel ultimately set up DMA mappings, since the full range of DMA hardware to be supported would not be something that it would be good to try to abstract at the DMAMemory class level, since doing so would be reinventing functionality that the microkernel must already support, and since it would probably not be possible to develop a sufficiently general scheme that deals with all the conceivable flavors of DMA hardware.

Note in particular that the DMAMemory object is not concerned with whether the DMA addresses that the microkernel sets up for it are virtual DMA addresses that map through some IOMMU to physical DMA addresses, or whether the DMA addresses are physical DMA addresses. The addresses are simply DMA addresses, and such mappings are transparent to DMAMemory, and entirely maintained by the microkernel.

Device drivers can thus obtain a base address, using methods of DMAMemory described in detail below, which can be passed to the DMA controller, thereby allowing device drivers to provide full DMA functionality in a completely platform-independent manner.

AccessibleMemory Abstract Class

AccessibleMemory is what is given to drivers by bus managers, so that they can always access memory in a platform-independent manner, thus allowing them to be portable across all platforms. AccessibleMemory thus defines platform-independent abstract methods, such as setByte( ). Drivers should only use the methods abstracted in AccessibleMemory, or methods abstracted or implemented by the super-classes of AccessibleMemory, which are MainMemory, and Memory. Classes below AccessibleMemory, and also PhysicalMemory and DMAMemory, should only be accessed by bus managers, which understand platform specifics. That way, platform specifics will not creep into driver code. AccessibleMemory is either accessed by a CPU issuing normal load and store instructions, hence VirtualMemory, or it is accessed by a CPU issuing special I/O port instructions, hence PortIOMemory.

PhysicalMemory Class

In this memory model, PhysicalMemory is not accessible, because even on systems that do, not have MMUs, the abstraction is maintained that the CPUs are really accessing virtual memory (not physical memory) that happens to be mapped one-to-one to physical memory. This abstraction thus provides a means of handling systems with and without MMUs in the same general way. Since the PhysicalMemory class is a sub-class of the abstract class, MainMemory, PhysicalMemory provides implementations of the cache management methods abstracted in MainMemory. The PhysicalMemory class allows a bus manager to specify a range of physical addresses, perhaps for registers of a device driver. By itself, though, since PhysicalMemory cannot be accessed, it is not useful. But, there are methods of VirtualMemory and of DMAMemory for mapping this physical memory into virtual memory or DMA, respectively.

VirtualMemory Abstract Class

The VirtualMemory abstract class contains methods for setting up mappings to PhysicalMemory objects (mappings ultimately set up by the microkernel). As mentioned above, even on systems with no MMUs, VirtualMemory objects are mapped one-to-one to PhysicalMemory objects. The VirtualMemory class also has a method for allocating a specific amount of virtual memory (also ultimately done by the microkernel), without specifying any particular physical memory. There is even a method which then allows one to obtain an array of the underlying PhysicalMemory objects for a VirtualMemory object, which is especially useful when PhysicalMemory objects were not passed to construct the VirtualMemory object in the first place. It is possible for a bus manager to set up DMA to virtual memory, since, given a VirtualMemory object, the array of underlying PhysicalMemory objects can be obtained, and then passed to a method of DMAMemory to set up DMA. VirtualMemory class also supports lock( ) and unlock( ) methods that can be used before obtaining underlying physical memory parameters before setting up a DMA operation. As set forth in detail below, there is even a lockContiguous( ) method, which makes sure the underlying physical pages mapped are contiguous, which is necessary on platforms that do not have a means, such as an IOMMU, of doing scatter-gather. It is, of course, up to the specific bus manager, which understands platform specifics, to decide what methods are needed for the specific platform.

The VirtualMemory abstract class also implements cache management methods (ultimately performed by the microkernel), which are abstracted by MainMemory. These methods, too, depending upon the coherency characteristics of the platform (also platform specifics known by the bus manager), are useful when setting up DMA.

PortIOMemory Abstract Class

The other type of AccessibleMemory besides VirtualMemory is PortIOMemory, which is intended for CPUs issuing special port I/O operations, such as the Intel x86 series. The PortIOMemory abstract class itself only implements the cache management operations abstracted by MainMemory. In this case, though, there is no caching, and these methods do not do much.

SwappedPortIOMemory and UnSwappedPortIOMemory Classes

The bulk of the support for PortIOMemory is in its two sub-classes, SwappedPortIOMemory and UnSwappedPortIOMemory, which each implement all the memory access methods abstracted by AccessibleMemory. As the names would imply, one does byte-swapping of the data written (to support different endianness between the CPU and memory), and the other does not. It is up to the bus manager (which knows such endianness) to decide which of these two to instantiate.

The reason for having two classes, one for swapped and one for unswapped, is so it is not necessary to have a conditional that checks for whether or not memory is byte-swapped in each of the native methods. Also, the driver should not be required to know whether or not memory is swapped, since that would run counter to the need for full driver platform independence.

VirtualIOMemory and VirtualRegularMemory Abstract Classes

VirtualMemory is either mapped to I/O space, hence VirtualIOMemory, or it is not, hence VirtualRegularMemory. The reason for the two different abstract classes is that on some platforms accesses to I/O space may also require operations to flush out the pipeline. Both VirtualIOMemory and VirtualRegularMemory currently provide no functionality, but instead leave it to sub-classes to provide all functionality. Each of these two classes is only included in case there is ever anything common to its sub-classes that should be abstracted at a level higher.

SwappedVirtualIOMemory and UnSwappedVirtualIOMemory Classes

Similarly to PortIOMemory, VirtualIOMemory has two sub-classes, SwappedVirtualIOMemory and UnSwappedVirtualIOMemory, which each implement all the memory access methods abstracted by AccessibleMemory.

SwappedVirtualRegularMemory and UnSwappedVirtualRegularMemory Classes

Also similarly to PortIOMemory, VirtualRegularMemory has two sub-classes, SwappedVirtualRegularMemory and UnSwappedVirtualRegularMemory, which each implement all the memory access methods abstracted by AccessibleMemory.

Addresses

DMA memory, physical memory, and virtual memory are all addressed by addresses from the same Address abstract class. Since there are significant example of systems that have addresses with non-power-of-two number of bits, the Address class supports addresses with any number of bits between 1 and 64.

Unsigned Values Representing Addresses

Internally to the class, an Address object is represented as an unsigned value, along with an indication of the number of bits. Since the Java programming language does not have unsigned arithmetic as part of its foundation classes, it was necessary to develop some simple efficient algorithms for addition and comparison of addresses. The Address abstract class is abstract mainly because it is most efficient to use different algorithms for unsigned arithmetic, depending upon the number of bits used to represent the address value. There are two sub-classes, Address32 for addresses up to 32 bits, and Address64, for addresses up to 64-bits.

Platform Dependence and Platform Independence

When a bus manager constructs any of the Memory and DMA classes, it must provide a base Address and a length (also represented as an Address). To do this, it must first construct each of these Address objects, and doing so requires knowing the number of bits for that the specific type of address on the specific platform (platform specific information bus managers do know).

Drivers, on the other hand, always access AccessibleMemory objects that have been constructed by bus mangers, and drivers always do so by providing an offset from the base of the AccessibleMemory object. So that drivers can be readily independent of platform specifics, such as the number of bits in a particular address, each memory access method of AccessibleMemory specifies the offset as an int. This allows memory objects up to 2 gigabytes. Although no presently known platform makes use of larger memory objects, methods can easily be added to the class to achieve even larger memory objects.

Representation of Virtual Addresses to the Microkernel

For simplicity, once an address is passed to the microkernel, it is represented (in native methods) simply as a 64-bit unsigned integer (for the value).

VirtualAddressSpace Class

Some of the machines that utilize the invention may have MMUs, so it is desirable to support multiple virtual address spaces, which allows there to be multiple virtual machines. With some prior art systems, applications always access memory in the same virtual address space as that of the drivers. But, with multiple virtual machines supported running in multiple address spaces, sometimes an application will be in a different address space from its driver. That is, a given driver will be accessing a memory object and will have synchronization methods for such access to handle the possibility of multiple threads of the same virtual machine running in that driver simultaneously. Since the virtual machines do not have efficient mechanisms for communication that could be used to provide synchronization for instances of the same driver running in separate virtual machines, but possibly accessing the same underlying memory object (say a register that is mapped in for both), it follows that a particular driver will probably always be in the same virtual address space, while applications that use that driver may be in different address spaces.

To address the above considerations, a VirtualAddressSpace class is provided as part of the Memory and DMA Classes, and it has a single static method, getVasID( ), for obtaining the virtual address space ID of the currently running thread. This ID is obtained from the microkernel. For efficiency, it is cached by getVasID( ), so the microkernel does not have to be called upon each time.

Use of Virtual Address Space ID

When VirtualMemory objects are constructed, the virtual address space ID is one of the parameters of the constructor. This ID is eventually provided to the microkernel when the microkernel is requested to map the virtual memory. It follows that only the microkernel assigns semantics to the value of the virtual address space ID.

Device Interface Classes

The material below describes classes 50 which constitute a first package of data types, including memory classes. These classes are platform independent and can thus be imported by platform-independent Java programming language code of the operating system, such as drivers, thereby providing fully functional platform-independent drivers. Also, since they are platform-independent, these classes do not depend upon any of the platform-dependent memory classes 72 (FIG. 2).

For each class, all public fields are documented.

Address public abstract class Address

All memory objects of the Memory and DMA classes use Address objects for their addresses. Since there are some actual significant examples of hardware which has addresses with non-power-of-two number of bits, addresses of any number of bits between 1 and 64 are supported. As the Address class is abstract, it is extended by Address32, which provides support for addresses between 1 and 32 bits, and Address64, which provides support for addresses between 33 and 64 bits.

The Address class defines public abstract methods which are implemented by Address32 and Address64:

public abstract String to String( );

public abstract int intvalue( );

public abstract long longValue( );

In addition to the protected constructor and public methods specified below, which are common to both sub-classes, the Address abstract class also implements a package private method for checking whether or not two Addresses are of the same type (same number of bits).

Address protected Address (int bits)

The Address class itself only keeps track of the number of bits. The value of the address is stored in the sub-class.

getBitWidth public int getBitwidth( )

Returns:

The number of bits (between 1 and 64) of this address.

addAddr public Address addAddr(Address other) throws InvalidAddressException;

Parameters:

other—The Address to add to this Address.

Returns:

An Address whose value is the sum of this Address and the other Address, and which has the same number of bits as both this Address and the other Address.

Throws:

InvalidAddressException is thrown if the other Address does not have the same number of bits as this Address, or if the unsigned sum of the values of both Addresses overflows the maximum unsigned value than can he represented with the number of bits common to these two Addresses.

This method is included for completeness, so that a client can form an Address which is the sum of a base Address and an offset (also represented as an Address), without the client having to implement its own algorithms for unsigned arithmetic. However, since clients always access (read or write) memory objects by specifying only an offset, leaving the Memory classes to compute the address of access (sum of the base Address and offset), the clients should not really need to use this method.

This method invokes the appropriate method of the underlying Address sub-class.

addrCompare public int addrCompare(Address other) throws InvalidAddressException;

Parameters:

other—The Address to compare with this address.

Returns:

−1 if the value of this Address is greater than the value of the other Address.

0—if the value of this Address is equal to the value of the other Address.

−1—if the value of this Address is less than the value of the other Address.

Throws:

InvalidAddressException is thrown if the other Address does not have the same number of bits as this Address.

Clients access (read or write) a memory object by specifying an offset (also represented as an Address). This method allows a client to determine whether this offset is valid (less than the length of the memory object), without having to implement its own algorithms for unsigned arithmetic. However, it is not absolutely necessary that the client use this method, since the Memory class access methods already do bounds checking.

This method invokes the appropriate method of the underlying Address sub-class.

Address32
  public class Address32 extends Address
  The Address32 class extends the abstract Address class, and provides support for addresses whose number of bits is between 1 and 32, inclusive. The public methods specified here consist of construction methods and implementations of abstract public methods of the Address abstract class.
  It should be noted that the Address32 class also implements package private methods for unsigned 32-bit addition and unsigned 32-bit comparison, which are more efficient for internal calculations than the public methods, addAddr( ) and addrCompare( ) of the Address class. These package-private methods are more efficient because they do not have to allocate the Address object to return.
Address32
  public Address32(int addrvalue, int bitwidth) throws InvalidAddressException
  public Address32(int addrvalue)
  public Address32(long addrvalue, int bitwidth) throws InvalidAddressException
  Parameters:
    addrvalue—The actual value of the Address. If bitwidth is specified, and it is less than 32, only the least significant bitwidth number of bits is used for the value of the Address.
    bitwidth—The number of bits (between 1 and 32) of the Address.
  Throws:
    Invalid Address Exception is throws if a bitwidth is specified which is not between 1 and 32, inclusive.
  The first of these constructors allows the client to create a general type of address of between 1 and 32 bits. The second constructor is provided for convenience to construct the more common 32-bit Address. The third constructor is provided for convenience, when the value for the Address is a long. In this case, though, only the least significant 32-bits (or less) are used.
to String
  public String to String( )
  Returns:
    A string representing this Address32 object.
intValue
  public int intvalue( )
  Returns:
    The least significant 32 bits of the address value.
long Value
  public long Value( )
  Returns:
    The least significant 64 bits of the address value.
Address64
  public class Address 64 extends Address
  The Address64 class extends the abstract Address class, and provides support for addresses whose number of bits is between 33 and 64, inclusive. The public methods specified here consist of construction methods and implementations of abstract public methods of the Address abstract class.
  It should be noted that the Address64 class also implements package private methods for unsigned 64-bit addition and unsigned 64-bit comparison, which are more efficient for internal calculations than the public methods, addAddr( ) and addrCompare( ) of the Address class. These package-private methods are more efficient because they do not have to allocate the Address object to return.
Address64
  public Address64(long addrvalue, int bitwidth) throws InvalidAddressException
  public Address64(long addrvalue)
  Parameters:
    addrvalue—The actual value of the Address. If bitwidth is specified, and it is less than 64 only the least significant bitwidth number of bits is used for the value of the Address.
    bitwidth—The number of bits (between 33 and 64) of the Address.
  Throws:
    InvalidAddressException is throws if a bitwidth is specified which is not between 33 and 64, inclusive.
  The first of these constructors allows the client to create a general type of address of between 33 and 64 bits. The second constructor is provided for convenience to construct the more common 64-bit Address.
toString
  public StringtoString
  Returns:
    A string representing this Address64 object.
intValue
  public int intvalue( )
  Returns:
    The least significant 32 bits of the address value.
longValue
  public long longvalue( )
  Returns:
    The least significant 64 bits of the address value.
AddressSpace
  public abstract class AddressSpace
  Every bus manager manages a set of address spaces. The memory classes themselves have three address spaces (see VirtualAddressSpace. PhysicalAddressSpace and DMAAddressSpace) which are all logically part of the particular bus manager known as the PlatformBusManager, the highest level bus manager. Besides these address spaces, there are other address spaces that other bus managers can instantiate. All such address spaces are sub-classes of the AddressSpace abstract class.
AddressSpace
  protected AddressSpace (ExpansionBus b, String n)
  Parameters:
    b—Specifies the bus that has this particular & address space.
    n—A string naming this address space.
  This constructor simply initializes protected variables with the supplied values.
  A protected initialization routine is also provided so that the sub-class can initialize the bit-size of the address space and an id for the address space. Both of these initializers might be obtained by the sub-class via native methods. In the case where there may be multiple address spaces of a particular type (e.g. virtual), the id obtained from the micro-kernel uniquely specifies one, so that it can be specifically identified. Using the initializer for the number of bits of the address space, the AddressSpace class computes and stores Address objects representing the lowest and highest possible addresses.
getID
  public int getID( )
  Returns:
    The id that specifies which particular address space (see above).
getName
  public String getName( )
  Returns:
    The String used to initialize this address space in the constructor.

getExpansionBus public String getName( )

Returns:

The bus used to initialize this address space in the constructor.

getLowestAddress public String getLowestAddress( )

Returns:

The lowest address value possible in this address space.

getHighestAddress public String getHighestAddress( )

Returns:

The highest address value possible in this address space.

MemoryConstraints public class MemoryConstraints

When a bus manager creates a memory object, it may need to specify constrains of both the allocation of the memory object, and subsequent accesses to the memory object by a driver. For example, some DMA controllers may have a limited range of addresses they can emit, thus necessitating that a DMA object (a memory object) be allocated only in that address range. As an example of access constraints, some registers may only be accessible as bytes, such that any other access may cause some sort of system failure.

The MemoryConstraints object encapsulates such allocation and access constraints, so that they can be passed together to a constructor of a memory object.

The MemoryConstraints class contains a constructor used to specify all the various constraints, and several methods for obtaining and setting each of the various constraints. This class also contains package private methods for checking whether a requested access satisfies the constraints, and whether a specified allocation matches the constraints.

The following constants are defined:

public static final int ALIGN_BYTE=0;

public static final int ALIGN_SHORT=1;

public static final int ALIGN_INT=2;

public static final int ALIGN_LONG=3;

public static final int ALIGN_CACHE=4;

public static final int ALIGN_PAGE=5;

public static final int READONLY=0;

public static final int READWRITE=1;

MemoryConstraints public MemoryConstraints (Address alloc_min_a, Address alloc_max_a, int alloc_align, int cache, boolean lock, boolean waitformem, boolean swapped, boolean io, boolean virtual, int access_min_s, int access_max_s, int access_align, int rw) throws InvalidAddressException Parameters:

alloc_min_a—The minimum address for allocation.

alloc_max_a—The maximum address for allocation.

alloc_align—The minimum number of least significant bits of the base address of an allocation that must be all 0S. A value of 0 thus indicates there are no alignment constraints for allocations. The maximum value supported of alloc_align is 16 (64K byte alignment).

cache—Indicates caching of the memory (either MainMemory.CACHE_MODE_DEFAULT, MainMemory.CACHE_MODE_INHIBITED.MainMemory.CACHE_MODE_WRITE_THROUGH, MainMemory.CACHE_MODE_COPY_BACK).

lock—Indicates whether or not the mappings for the memory are to be locked.

swapped—If true, indicates a type of memory is to be constructed, where byte-swapping is to be done.

io—If true, indicates a type of memory is to be constructed that is I/O memory (either PortIOMemory or VirtualIOMemory).

virtual—If true, indicates a type of memory is to be constructed that is VirtualMemory.

waitformem—Indicates whether or not to wait indefinitely for the allocation of the memory, if there is a resource problem.

access_min_s—The log (base2) of the minimum size in bytes of memory that can be accessed. Thus, 0 indicates that a single byte can be accessed.

access_max_s—The log (base 2) of the maximum size in bytes of memory that can be accessed (up to 3).

access_align—The minimum number of least significant bits of an access address that must be all 0s. A value of 0 thus indicates that there are no alignment constraints for accesses. The maximum value supported of access_align is 16 (64K byte alignment).

rw—READONLY (0) indicates read-only access, while READWRITE(1) indicates read-write access.

Throws:

InvalidAddressException is thrown if alloc_min_a and alloc_max_a do not agree on their number of bits, or if the value of alloc_min_a is not less than the value of alloc_max_a.

The maximum size allocation alignment supported is ALIGN_PAGE (5), and the minimum is, of course, ALIGN_BYTE(0), so if the specified alloc_align is greater than ALIGN_PAGE (5), it is set to 5, or if the specified alloc_align is less than ALIGN_BYTE(0), it is set to 0.

If the specified access_min_s is less than 0, it is set to 0 (1 byte), or if the specified access_minds is greater than 3, it is set to 3 (8 bytes, a long). Similarly, if the specified access_max_s is less than 0, it is set to 0 (1 byte), or if the specified access_max_s is greater than 3, it is set to 3 (8 bytes, a long). If access_max_a is still less than access_min_a, access_max_a is set to the value of access_min_a.

The maximum size access alignment supported is ALIGN_LONG(3), and the minimum supported is, of course, ALIGN_BYTE(0), so if the specified access_align is greater than ALIGN_LONG(3), it is set to 3, or if the specified access_align is less than ALIGN_BYTE(0), it is set to 0.

If rw is not set to READONLY, it is set to READWRITE.

getAllocMinAddr public Address getAllocMinAddr( )

Returns:

The minimum allocation Address, alloc_min_a, which was specified by either the constructor, or by the setAllocAddrs( ) method.

getAllocMaxAddr public Address getAllocMaxAddr( )

Returns:

The maximum allocation Address, alloc_max_a, which was specified by either the constructor, or by the setAllocAddrs( ) method.

setAllocAddrs public void setAllocAddrs(Address alloc_min_a, Address alloc_max_a) throws InvalidAddressException Parameters:
  alloc_mill_a—The minimum address for allocation.
  alloc_max a—The maximum address for allocation.
Throws:
  InvalidAddressException is thrown if alloc_min_a and alloc_max_a do not agree on their number of bits, or if the value of alloc_mill_a is not less than the value of alloc_max_a.
getAllocAlign
  public int getAllocAlign( )
  Returns:
    The alignment for allocations, alloc_align, as specified by either the constructor, or by the setAllocAllign( ) method. Note that this value may be different from the value specified (see descriptions of the constructor or the setAllocAlign method).
setAllocAlign
  public void setAllocAlign(int alloc_align)
  Parameters:
    alloc_align—The minimum number of least significant bits of the base address of an allocation that must be all 0s. A value of 0 thus indicates there are no alignment constraints for allocations. The maximum value supported of alloc_align is 16 (64K byte alignment).
  The maximum size allocation alignment supported is ALIGN_PAGE (5), and the minimum is, of course, ALIGN_BYTE(0), so if the specified alloc align is greater than ALIGN_PAGE (5), it is set to 5, or if the specified alloc_align is less than ALIGN_BYTE(0), it is set to 0.
getCacheMode
  public int getCacheMode( )
  Returns:
    The cache mode, cache, as specified by either the constructor, or by the setMiscAlloc( ) method.
getLocked
  public boolean getLocked( )
  Returns:
    The indication of whether mappings are to be locked upon allocation, lock, as specified by either the constructor, or by the setMiscAlloc( ) method.
getWaitforMem
  public boolean getwaitFormMem( )
  Returns:
    The indication of whether or not to wait for memory indefinitely during allocation, waitformem, as specified by either the constructor, or by the setMiscAlloc( ) method.
getSwapped
  public int getSwapped( )
  Returns:
    The argument swapped, as specified by either the constructor, or by the setMiscAlloc( ) method.
getIO
  public int getIO( )
  Returns:
    The argument, io, as specified by either the constructor, or by the setMiscAlloc( ) method.
getVirtual
  public int getVirtual( )
  Returns:
    The argument, virtual, as specified by either the constructor, or by the setMiscAlloc( ) method.

setMiscAlloc
  public void setMiscAlloc(int cache, boolean lock, boolean waitformem, boolean swapped, boolean io, boolean virtual)
  Parameters:
    cache—Indicates caching of the memory (either MainMemory.CACHE_MODE_DEFAULT, MainMemory.CACHE MODE_INHIBITED, MainMemory. CACHE_MODE WRITE_THROUGH, or MainMemory. CACHE_MODE_COPY_BACK).
    lock—Indicates whether or not the mappings for the memory are to be locked.
    waifformem—Indicates whether or not to wait indefinitely for the allocation of the memory, if there is a resource problem.
    swapped—If true, indicates a type of memory is to be constructed, where byte-swapping is to be done.
    io—If true, indicates a type of memory is to be constructed that is I/O memory (either PortIOMemory or VirtualIOMemory).
    virtual—if true, indicates a type of memory is to be constructed that is VirtualMemory.
getAccessMinSize
  public int getAccessMinSize( )
  Returns:
    The minimum size for accesses, access_min_s, as specified by either the constructor, or by the setAccessSizes( ) method. Note that this value may be different from the value specified (see descriptions of the constructor or the setAccessSizes( ) method).
getAccessMaxSize
  public int getAccessMaxSize( )
  Returns:
    The maximum size for accesses, access_max_s, as specified by either the constructor, or by the setAccessSizes( ) method. Note that this value may be different from the value specified (see descriptions of the constructor or the setAccessSizes( ) method).
setAccessSizes
  public void setAccessSizes(int access_min_s, int access_max_s)
  Parameters:
    access_min_s—The log (base 2) of the minimum size in bytes of memory that can be accessed. Thus, 0 indicates that a single byte can be accessed.
    access_max_s—The log (base 2) of the maximum size in bytes of memory that can be accessed(up to 3).
  If the specified access_min_s is less than 0, it is set to 0 (I byte), or if the specified access_min_s is greater than 3, it is set to 3 (8 bytes, a long). Similarly, if the specified access_max_s is less than 0, it is set to 0 (1 byte), or if the specified access_max_s is greater than 3, it is set to 3 (8 bytes, a long). If access_max_a is still less than access_min_a, access_max_a is set to the value of access_min_a.
getAccessAlign
  public void getAccessAlign( )
  Returns:
    The alignment for accesses, access_align, as specified by either the constructor, or by the setAccessAlign( ) method. Note that this value may be different from the value specified (see descriptions of the constructor or the setAccessAlign method).

setAccessAlign public void setAccessAlign(int access_align)

Parameters:

access_align—The minimum number of least significant bits of an access address that must be all 0s. A value of 0 thus indicates that there are no alignment constraints for accesses. The maximum value supported of access_align is 16 (64K byte alignment). The maximum size access alignment supported is ALIGN_LONG(3), and the minimum supported is, of course, ALIGN_BYTE(0), so if the specified access_align is greater than ALIGN_LONG(3), it is set to 3, or if the specified access_align is less than ALIGN_BYTE(0), it is set to 0.

getReadWrite public int getReadwrite( )

Returns:

The mode of access, either READONLY, or READWRITE. Note that this value may be different from the value specified (see descriptions of the constructor or the setReadWrite method).

setReadWrite public void setReadwrite(int rw)

Parameters:

rw—READONLY indicates read-only access, while READWRITE indicates read-write access.

If rw is not set to READONLY, it is set to READWRITE.

Memory public abstract class Memory

All memory objects of the Memory and DMA classes are ultimately sub-classes of the abstract class Memory. The Memory abstract class defines two abstract methods:

public abstract String toString( );

In addition to the fundamental public methods specified below that are common to all memory objects, the Memory class also implements package private methods for checking validity of an access (specified by offset within a memory object, size, mode (read or write), and count in bytes), and for obtaining the address of an access, given an offset of the memory object.

Memory protected Memory (Address ba, Address len, MemoryConstraints mc) throws InvalidAddressException protected Memory ( )

protected Memory (Memory superrange, Address offset, Address len) throws InvalidAddressException, AllocationException Parameters:

ba—The base Address of the Memory object.

len—The length in bytes of the Memory object.

mc—Constraints of the memory object.

Throws:

InvalidAddressException is thrown if an overflow occurs when adding the base Address, ba, to the length, len.

AllocationException is thrown, in the case of the third protected constructor, if the super-range Memory object is invalid.

This first protected constructor simply calculates the end Address (ba+len), saves all the parameters, along with the calculated end Address in protected variables of this class, initializes the memory to valid, and allocates protected internal data structures.

The second protected constructor is used in the case where the underlying Memory object cannot be initialized when first constructed (e.g. VirtualMemory whose base address will not be known until the memory has been mapped in). A protected method is provided for later initializing the Memory object, thus completing what would have been initialized had the first protected constructor been used.

The third protected constructor is used in the case where the memory object being constructed is a sub-range of an existing memory object. The memory base Address and end Address are calculated based upon the offset to the super-range Memory object, and the new Memory object is associated as a sub-range of the superrange and initialized to valid. Protected internal data structures area also allocated.

getMemBaseAddr public Address getMemBaseAddr( )

Returns:

The base Address of the Memory object if the memory is valid, and null otherwise.

getMemLength public Address getMemLength( )

Returns:

The length of the Memory object in bytes if the memory is valid, and null otherwise.

getMemEndAddr public Address getMemEndAddr ( )

Returns:

The end Address of the Memory object if the memory is valid, and null otherwise.

getMemValid public boolean getMemValid( )

Returns:

The indication of whether or not the memory is valid.

getMemConstraints public MemoryConstraints getMemConstraints ( )

Returns:

The constraints of the memory if the memory is valid, otherwise null.

getSuperRange public Memory getSuperRange( )

Returns:

The Memory object which is a super-range of this Memory object, if it is a sub-range; otherwise returns null.

getSubRanges public Vector getSubRanges( )

Returns:

The a Vector of Memory objects which are sub-ranges of this Memory object. If there are no sub-ranges or if this Memory object is invalid, null is returned.

MemoryDescriptor public class MemoryDescriptor extends Memory

All real instantiated memory objects are ultimately platform-dependent and are thus constructed by code in the sun javaos memory package. Sometimes, though, It is useful for drivers or bus managers to be able to instantiate a memory object, which is a descriptor for memory that will be allocated later. The MemoryDescriptor class, as an instantiable sub-class of Memory, meets that need.

Associated with a MemoryDescriptor object is an address space, managed by some bus manager, within which this descriptor of memory is defined.

MemoryDescriptor
  public MemoryDescriptor(Address ba, Address len, MemoryConstraints mc, AddressSpace as, String name) throws InvalidAddressException
  public MemoryDescriptor(Address ba, Address len, AddressSpace as, String name) throws InvalidAddressException
  Parameters:
    ba—The base Address of the Memory object.
    len—The length in bytes of the Memory object.
    mc—Constraints of the memory object.
    as—The AddressSpace in which this memory object lives.
    name—Some name that is used to identify this memory object. This is useful when a bus manager is allocating an array of MemoryDescriptors, specifying all the various memory objects that a driver needs to have mapped, since it allows the driver to identify each of the memory objects.
  Throws:
    InvalidAddressException is thrown if the constructor of the super-class (Memory) throws InvalidAddressException. In other words, this constructor does not catch that exception.
  The first constructor simply calls the constructor of the super-class, Memory, using all but the AddressSpace argument, and then stores the AddressSpace in a private variable.
  The second constructor is provided for convenience, and is the same as the first constructor, except that null is passed to the Memory constructor for the mc (MemoryConstraints) parameter.
toString
  public String toString( )
  Returns:
    A string representing this MemoryDescriptor object.
getAddressSpace
  public AddressSpace getAddressSpace ( )
  Returns:
    The AddressSpace in which this descriptor of Memory exists, as specified in the constructor.
getName
  public String getName( )
  Returns:
    The string naming this particular MemoryDescriptor as specified in the constructor.
MainMemory
  public abstract class MainMemory extends Memory
  All memory objects which represent memory that can be accessed ultimately by a CPU (everything except DMAMemory, the already described super-class Memory, and MainMemory itself) is a sub-class of the abstract class, MainMemory.
  MainMemory defines the following abstract methods:
  public abstract void setCacheMode(int mode);
  public abstract int getCacheMode( );
  public abstract void flushCache( );
  MainMemory also defines the following constants to be used as parameters for implementations of setCacheMode( ) and return values of implementations of getCacheMode( ):
    public static final int CACHE_MODE_DEFAULT=0x0;
    public static final int CACHE_MODE_AMBIGUOUS=0x1;
    public static final int CACHE_MODE_INHIBITED=0x2;
    public static final int CACHE_MODE_WRITE_THROUGH=0x3;
    public static final int CACHE_MODE_COPY_BACK=0x4;
  The only methods implemented for this class are protected constructors. No public methods are implemented.
MainMemory
  protected MainMemory (Address ba, Address len, MemoryConstraints mc) throws InvalidAddressException
  protected MainMemory ( )
  protected MainMemory (MainMemory superrange, Address offset, Address len) throws InvalidAddressException, AllocationException
  Parameters:
    ba—The base Address of the Memory object.
    len—The length in bytes of the Memory object.
    mc—Constraints of the memory object.
  Throws:
    InvalidAddressException is thrown if an overflow occurs when adding the base Address, ba, to the length, len.
    AllocationException is thrown, in the case of the third protected constructor, if the super-range Memory object is invalid.
  Each of these protected constructors simply calls the corresponding protected constructor of the super-class, Memory.
AccessibleMemory
  public abstract class AccessibleMemory extends MainMemory
  All memory objects of the Memory and DMA classes which represent memory that can be accessed directly by a CPU (every sub-class of MainMemory except PhysicalMemory and AccessibleMemory itself) is a sub-class of the abstract class, AccessibleMemory.
  Platform-independent code, such as drivers, always access Memory via the methods of AccessibleMemory, not knowing or caring what the underlying memory object may be.
  AccessibleMemory defines the following protected abstract methods, which are internal implementations of the publicly defined access methods:
  protected abstract int ncksum(long adr, long len);
  protected abstract void nSetByte(long adr, byte x);
  protected abstract void nSetShort(long adr, short x);
  protected abstract void nsetInt(long adr, int x);
  protected abstract void nsetLong(long adr, long x);
  protected abstract void nSetBytes(long adr, byte bytes[ ],int bytesOffset, int length);
  protected abstract void nsetIntArray(long adr, byte bytes[ ),int bytesOffset, int length_int);
  protected abstract byte nGetByte(long adr);
  protected abstract short nGetShort(long adr);
  protected abstract int nGetInt(long adr);
  protected abstract long nGetLong(long adr);
  protected abstract void nGetBytes(long adr, byte bytes[ ],int bytesOffset, int length);
  protected abstract void nsetIntArray(long adr, byte bytes[ ],int bytesOffset, int length_int);
  protected abstract int nRegisterSource(long adrl, long len);
  protected abstract void nCopy(long adr2, long len, int copyID);

There are no other non-public methods defined, besides the constructor.

AccessibleMemory does not implement any of the abstract methods of the two classes above it in the hierarchy, MainMemory and Memory.

It should be noted that each of the access methods below checks for invalid accesses, and if there is a violation, a system message is logged, and the access is not performed. The reason for not simply having these methods throw an exception is that then all current calls in various drivers— and there are very many—would need to be modified to declare the exception thrown, when drivers are ported to the new Memory classes.

AccessibleMemory
  protected AccessibleMemory(Address ba, Address len, MemoryConstraints mc) throws InvalidAddressException
  protected AccessibleMemory ( )
  protected AccessibleMemory (AccessibleMemory superrange, Address offset, Address len) throws InvalidAddressException, AllocationException
  Parameters:
    ba—The base Address of the Memory object.
    len—The length in bytes of the Memory object.
    mc—Constraints of the Memory object.
  Throws:
    InvalidAddressException is thrown if an overflow occurs when adding the base Address, ba, to the length, len.
    AllocationException is thrown, in the case of the third protected constructor, if the super-range Memory object is invalid.

Each of these protected constructors simply calls the corresponding protected constructor of the super-class, MainMemory.

setAddress
  public void setAddress(int offset, Address value)
  Parameters:
    offset—Offset from the base of the memory object to the place where the access (in this case a write) is to be done.
    value—The Address whose value is to be written at the access location.
  Note:
    The access is not done and a system message is logged if the memory is not valid (defined in Memory class), if the offset (plus size of access) is beyond the end of the memory object, or if any of the constraints defined in the constraints of the super-class Memory object is violated.

cksum
  public int cksum(int offset, int len)
  Parameters:
    offset—Offset from the base of the memory object to the place where the checksum computation is to start.
    len—The length in bytes over which the checksum is to be computed.
  Returns:
    The computed checksum (modulo 0x10000), or 0 if the access is not allowed (see Note).
  Note:
    The checksum is not done (but 0 is returned) and a system message is logged if the memory is not valid (defined in Memory class), or if the offset (plus length, len, of access) is beyond the end of the memory object.

setByte
  public void setByte(int offset, byte x)
  Parameters:
    offset—Offset from the base of the memory object to the place where the access (in this case a write) is to be done.
    x—The value to be written at the access location.
  Note:
    The access is not done and a system message is logged if the memory is not valid (defined in Memory class), if the offset (plus size of access) is beyond the end of the memory object, or if any of the constraints defined in the constraints of the super-class Memory object is violated.

setShort
  public void setShort(int offset, short x)
  Parameters:
    offset—Offset from the base of the memory object to the place where the access (in this case a write) is to be done.
    x—The value to be written at the access location.
  Note:
    The access is not done and a system message is logged if the memory is not valid (defined in Memory class), if the offset (plus size of access) is beyond the end of the memory object, or if any of the constraints defined in the constraints of the super-class Memory object is violated.

setInt
  public void setInt(int offset, int x)
  Parameters:
    offset—Offset from the base of the memory object to the place where the access (in this case a wire) is to be done.
    x—The value to be written at the access location.
  Note:
    The access is not done and a system message is logged if the memory is not valid (defined in Memory class), if the offset (plus size of access) is beyond the end of the memory object, or if any of the constraints defined in the constraints of the super-ass Memory object is violated.

setLong
  public void setLong(int offset, long x)
  Parameters:
    offset—Offset from the base of the memory object to the place where the access (in this case a write) is to be done.
    x—The value to be written at the access location.
  Note:
    The access is not done and a system message is logged if the memory is not valid (defined in Memory class), if the offset (plus size of access) is beyond the end of the memory object, or if any of the constraints defined in the constraints of the super-class Memory object is violated.

setBytes
  public void setBytes(int offset, byte bytes[ ], int bytesOffset, int length)
  Parameters:
    offset—Offset from the base of the memory object to the place where the access (in this case a write) is to be done.

bytes—The array of bytes to be written to the memory.
bytesOffset—The index within the array, bytes, to begin.
length—The number of bytes to write.
Note:
The access is not done and a system message is logged if the memory is not valid (defined in Memory class), if bytesOffset is negative, if length is not greater than 0, if the offset (plus total size of access) is beyond the end of the memory object, or if any of the constraints defined in the constraints of the super-class Memory object is violated.

setIntArray
public void setIntArray(int offset, byte bytes[ ], int bytesOffset, int length_int)
Parameters:
offset—Offset from the base of the memory object to the place where the access (in this case a write) is to be done.
bytes—The array of bytes to be written (as integers) to the memory.
bytesOffset—The index within the array bytes to begin.
length_int—The number of ints to write.
Note:
The access is not done and a system message is logged if the memory is not valid (defined in Memory class), if bytesOffset is negative, if length_int is not greater than 0, if the offset (plus total sire of access) is beyond the end of the memory object, or if any of the constraints defined in the constraints of the super-class Memory object is violated.

getByte
public byte getByte(int offset)
Parameters:
offset—Offset from the base of the memory object to the place where the access (in this case a read) is to be done.
Returns:
The value read from the access location.
Note:
The access is not done and a system message is logged if the memory is not valid (defined in Memory class), if the offset (plus size of access) is beyond the end of the memory object, or if any of the constraints defined in the constraints of the super-ass Memory object is violated.

getShort
public short getShort(int offset)
Parameters:
offset—Offset from the base of the memory object to the place where the access (in this case a read) is to be done.
Returns:
The value read from the access location.
Note:
The access is not done and a system message is logged if the memory is not valid (defined in Memory class), if the offset (plus size of access) is beyond the end of the memory object, or if any of the constraints defined in the constraints of the super-class Memory object is violated.

getInt
public int getInt(int offset)
Parameters:
offset—Offset from the base of the memory object to the place where the access (in this case a read) is to be done.
Returns:
The value read from the access location.
Note:
The access is not done and a system message is logged if the memory is not valid (defined in Memory class), if the offset (plus size of access) is beyond the end of the memory object, or if any of the constraints defined in the constraints of the super-class Memory object is violated.

getLong
public long getLong(int offset)
Parameters:
offset—Offset from the base of the memory object to the place where the access (in this case a read) is to be done.
Returns:
The value read from the access location.
Note:
The access is not done and a system message is logged if the memory is not valid (defined in Memory class). If the offset (plus size of access) is beyond the end of the memory object, or if any of the constraints defined in the constraints of the super-class Memory object is violated.

getBytes
public void getbytes(int offset, byte bytes[ ], int bytesOffset, int length)
Parameters:
offset—Offset from the base of the memory object to the place where the access (in this case a read) is to be done.
bytes—The array of bytes to be read from memory.
bytesOffset—The index within the array bytes to begin.
length—The number of bytes to read.
Note:
The access is not done and a system message is logged if the memory is not valid (defined in Memory class), if bytesOffset is negative, if length is not greater than 0, if the offset (plus total size of access) is beyond the end of the memory object, or if any of the constraints defined in the constraints of the super-class Memory object is violated.

getIntArray
public void getIntArray(int offset, int ints[ ], int intsOffset, int length_int)
Parameters:
offset—Offset from the base of the memory object to the place where the access (in this case a read) is to be done.
ints—The array of ints to be written to the memory.
intsOffset—The index within the array ints to begin.
length_int—The number of ints to write.
Note:
The access is not done and a system message is logged if the memory is not valid (defined in Memory class), if intsOffset is negative, if length_int is not greater than 0, if the offset (plus total size of access) is beyond the end of the memory object, or if any of the constraints defined in the constraints of the super-class Memory object is violated.

copy
void copy(int offset, AccessibleMemory dest, int destOffset, int length)
Parameters:
offset—Offset from the base of the memory object to the place where the access (in this case a read) is to be done.

dest—The memory object which contains the destination of the copy.

destOffset—Offset (expressed as either an Address, a short, an int, or a long) from the base of the memory object to the place where the access (in this case a write) is to be done.

Note:

The access is not done and a system message is logged if the memory (either source or destination) is not valid (defined in Memory class), if the offset (plus total size of access for both source and destination) is beyond the end of the memory object, if any of the constraints defined in the constraints of the super-class Memory object is violated, or if the two Memory objects are not the same basic type.

Platform Interface Classes

The material below describes classes 72 which constitute a second package of memory classes.

Unlike memory classes 50 which are platform-independent, the classes of memory package 72 are platform-dependent. These classes are primarily used by platform-dependent client code of, for example, bus managers. These classes depend upon and extend the platform-independent classes of javax.system.memory.

PhysicalAddressSpace public final class PhysicalAddressSpace extends AddressSpace The PhysicalAddressSpace is not really used by the memory classes themselves, since it is assumed that a machine only has one physical address space, but it is provided for completeness, and for use outside of the memory classes, with a MemoryDescriptor, by various bus managers.

Besides the constructor, the following public string is defined:

public final static String name="physical";

PhysicalAddressSpace

PhysicalAddressSpace (ExpansionBus b)

This constructor first calls the constructor of the super-class, AddressSpace, specifying the ExpansionBus argument and the String defined above, so that they may be used by the public methods, getExpansionBus( ) and getName( ) of AddressSpace. Then it calls the getAddressSize( ) and the alloc_id( ) native methods (see below) and supplies them to an protected initialization routine of AddressSpace, so that they may then be used by the public methods, getLowestAddress( ), getHighestAddress( ), and getID( ) of AddressSpace.

The PhysicalAddressSpace defines the following native methods, implemented in the microkernel, which provide the size of addresses (in bits) and an ID for the address space, respectively.

private native int getAddressSize( );

private native int alloc_id( );

PhysicalMemory

Public class PhysicalMemory extends MainMemory

The PhysicalMemory class allows bus managers to obtain access to objects at specific physical addresses (such as device registers which are listed to be at a specific physical address in the Java system Database (JSD)) and then map them into virtual memory (see VirtualMemory constructor methods) so they can be accessed by device drivers (via the AccessibleMemory access methods). It is also possible for bus managers to set up DMA to a specified array of PhysicalMemory objects (see DMAMemory constructor methods). In fact, a bus manager can even set up DMA to a range of memory mapped into virtual memory, by first locking the virtual to physical mappings (see lock( ) method of VirtualMemory), then calling the appropriate method of VirtualMemory (see getPhysicalMemory( ) method) to obtain an array of PhysicalMemory objects, and then passing this array to the appropriate DMAMemory constructor. The reverse is also possible, where the DMAMemory object is first constructed, and then the underlying PhysicalMemory objects obtained in order to construct a VirtualMemory object (accessible via AccessibleMemory) which maps to the same PhysicalMemory objects.

Although PhysicalMemory is very useful in conjunction with VirtualMemory (which is AccessibleMemory) or in conjunction with DMAMemory, it is not usable by itself. This is true even on a system which has no MMU, where a CPU accesses physical memory directly. Even in that case, the PhysicalMemory object is not an object that is accessed, but when that PhysicalMemory object is mapped to virtual memory, the VirtualMemory object can be accessed, and its virtual addresses happen to be the same as the underlying physical addresses. In this way, semantically, drivers or any other Java clients always access VirtualMemory objects, and never access PhysicalMemory objects.

The following constructors and public methods are defined:

PhysicalMemory public PhysicalMemory (Address basePA, Address len) throws InvalidAddressException Parameters:

basePA—The base physical address of the physical memory to be allocated.

len—The length in bytes of physical memory to be allocated.

Throws:

InvalidAddressException is thrown if the constructor called for the super-class (MainMemory) throws InvalidAddressException.

private PhysicalMemory(PhysicalMemory superrange, Address offset, Address len) throws InvalidAddressException, AllocationException superRange—the super-range PhysicalMemory object.

offset—The offset within the current PhysicalMemory object for the new sub-range.

len—The length of the new sub-range.

Throws:

InvalidAddressException is thrown if either the offset or the offset+newLength is beyond the range of the PhysicalMemory object from which the sub-range is being obtained.

AllocationException is thrown if the superrange Memory object is no longer valid.

The first constructor is public and can be used by a bus manager to allocate a PhysicalMemory object. This allocation does not actually involve anything done in the microkernel corresponding to the actual physical memory. Rather, the PhysicalMemory object is merely a descriptor for physical memory, and used for construction of a VirtualMemory (actually an instantiable sub-class of VirtualMemory) or DMAMemory object. It is at the time that such a VirtualMemory or DMAMemory object is constructed that the microkernel verifies the PhysicalMemory object.

This first constructor does not take a MemoryConstraints object as a parameter. Basically the reason is as follows. There are two types of constraints specified in a MemoryConstraints object, allocation constraints and access constraints. Allocation constraints do not apply, since nothing is actually allocated, and since the caller specifies the base address. Access constraints do not apply either, since PhysicalMemory objects are not accessible.

The second constructor is private, and is used internally by the getSubRange( ) method. It merely invokes the superclass (MainMemory) constructor for sub-ranges.

toString public String toString( )

Returns:

A string representing this PhysicalMemory object.

getSubRange public PhysicalMemory getSubRange(Address offset, Address newLength) throws InvalidAddressException Parameters:

offset—The offset within the current PhysicalMemory object for the new sub-range.

newLength—The length of the new sub-range.

Returns:

A PhysicalMemory object which is the specified sub-range.

Throws:

InvalidAddressException is thrown if either the offset or the offset+newLength is beyond the range of the PhysicalMemory object from which the sub-range is being obtained.

AllocationException is thrown if the superrange Memory object is no longer valid.

This method merely invokes the private constructor of this PhysicalMemory object.

getCacheMode public int getCacheMode( )

Returns:

The cache mode, either MainMemory.CACHE_MODE_INHIBITED, MainMemory.CACHE_MODE_WRITE_THROUGH, or MainMemory.CACHE_MODE_COPY_BACK.

Note that this method allows a bus manager to determine how the physical memory is cached if the PhysicalMemory object has just been constructed, or if CACHE_MODE_DEFAULT has been specified by setCacheMode( ).

setCacheMode public void setCacheMode(int mode)

Parameters:

mode—Set to one of: MainMemory.CACHE_MODE_DEFAULT, MainMemory.CACHE_MODE_INHIBITED), MainMemory.CACHE_MODE_WRITE_THROUGH, or MainMemory.CACHE_MODE_COPY_BACK.

This method allows the bus manager, which should know about cache coherency of various components of the specific platform it supports, to control the caching of physical memory. For example, on platforms where a physical memory cache is not coherent with DMA accesses, it would be necessary for the bus manager to temporarily set the cache mode to CACHE-MODE_INIBIEED, while DMA transfers are set up.

Specifically, this method requests the following, depending upon the specific value of mode:

CACHE_MODE_DEFAULT—Cache this range of physical memory according to what the default is for this type of physical memory on this platform. Note that, even on platforms that have physical address caches, some physical memory (e.g. I/O registers) may need to be uncached to be used correctly, so such physical memory will be made uncached. Also, note that if this range of physical memory encompasses different types of physical memory that need to be treated differently, this mode will result in different sub-ranges being cached differently, so that the entire range of physical memory is correctly cached. Whenever possible, this mode will result in caching being done to yield the greatest possible efficiency.

CACHE_MODE_INHIBITED—If there is a cache, and if it can be uncached, it is uncached. If this is not possible, but is possible on a sub-range, it is done on any such subranges. Otherwise, nothing is done.

CACHE_MODE_WRITE_THROUGH—If there is a cache, and if it can be converted to write-through mode, it is so converted. If this is not possible, but is possible on a sub-range, it is done on any such sub-ranges. Otherwise, nothing is done.

CACHE_MODE_COPY_BACK—If there is a cache, and if it can be converted to copy-back mode, it is so converted. If this is not possible, but is possible on a sub-range, it is done on any such sub-ranges. Otherwise, nothing is done.

flushCache public void flushCache( )

Simply flushes the cache if the physical memory is cached. If it is not cached, this method does nothing. Note that the physical caches are flushed for the entire range of addresses of this object.

The PhysicalMemory class defines the following native methods corresponding to the abstract cache management methods defined in MainMemory. Each of these native methods is implemented by functionality in the microkernel. For more details, refer to the Microkernel Interfaces Chapter.

private native void setcachemode (long base, long len, int mode);

private native int getcachemode(long base, long len);

private native void flushcache(long base, long len);

VirtualAddressSpace public final class virtualAddressSpace extends AddressSpace

Each virtual machine has its ownVirtualAddressSpace.

Besides the constructor, the following public string is defined:

public final static String name="virtual";

VirtualAddressSpace public VirtualAddressSpace (ExpansionBus b)

This constructor first calls the constructor of the superclass, AddressSpace, specifying the ExpansionBus argument and the String defined above, so that they may be used by the public methods, getExpansionBus( ) and getName( ) of AddressSpace. Then, it calls the getAddressSize( ) and the alloc_Id( ) native methods (see below) and supplies them to an protected initialization routine of AddressSpace, so that they may then be used by the public methods, getLowestAddress( ) getHighestAddress( ), and getID( ) of AddressSpace.

The VirtualAddressSpace defines the following native methods, implemented in the microkernel, which provide the size of addresses (in bits) and an ID for the address space, respectively. The ID is used when constructing VirtualMemory objects, so that the particular virtual address space for the mapping may be specified to the microkernel.

private native int getAddressSize( );

private native int alloc_id( );

VirtualMemory public abstract class VirtualMemory extends AccessibleMemory

The VirtualMemory object represents memory that can be accessed directly via load and store operations from a CPU, so it follows that VirtualMemory should be a sub-class of AccessibleMemory. The VirtualMemory abstract class does not actually implement any of the access methods that are abstracted by the AccessibleMemory class, as those abstract methods are all finally implemented by sub-classes of VirtualMemory. The Virtual Memory class does provide facilities for managing the mappings of VirtualMemory objects to PhysicalMemory objects, and these facilities are common to all the sub-classes of VirtualMemory.

VirtualMemory objects are always mapped to some physical memory (which ones it is mapped to cannot be determined unless the mappings are locked). However, even in the case when running on a machine without an MMU, there are still VirtualMemory objects, and they are simply mapped one to-one such that a virtual address is always equal to the underlying physical address.

The VirtualMemory class is abstract, since it extends AccessibleMemory without implementing any of the abstract methods defined in AccessibleMemory. VirtualMemory does not define any more abstract methods though.

When constructing a virtualMemory object, note that sometimes it is not possible to map the entire amount of memory specified, so the getMemLength( ) method of Memory should be called to determine the actual amount of memory mapped.

The following constructors and public methods are defined:

VirtualMemory

As the VirtualMemory class is an abstract class, and thus cannot be instantiated, all three of the following protected constructors are used by sub-classes. Note that sometimes it is not possible to map the entire amount of memory specified, so the getMemLength( ) method of Memory should be called to determine the actual amount of memory mapped.

protected VirtualMemory (int vasid, PhysicalMemory [ ] PMList, MemoryConstraints constraints) throws InvalidAddressException, AllocationException Parameters:
vasid—The virtual address space ID as obtained by calling the getID( ) method of the AddressSpace class, which is the super-class of VirtualAddressSpace.
PMList—An array of PhysicalMemory objects that are to be mapped into virtual memory in the order as they appear in the array.
constraints—The allocation constraints are used now during the allocation and mapping of the virtual memory; the access constraints are stored in the Memory object and used later when it is accessed.

Throws:
InvalidAddressException is thrown if the microkernel is not able to map virtual memory for the specified parameters.
AllocationException is thrown if the microkernel experiences an allocation failure when attempting to allocate virtual memory for the specified mapping A request is made to the microkernel to do the mapping, providing the vasid, arrays of base physical addresses and lengths, allocation constraints, and an indication that the mapping must be locked. The microkernel returns the base virtual address and length mapped, which this constructor then uses to initialize this Memory object.

protected virtualMemory(int vasid, Address len, MemoryConstraints constraints) throws InvalidAddressException, AllocationException Parameters:
vasid—The virtual address space ID as obtained by calling the getID( ) method of the AddressSpace class, which is the super-class of VirtualAddressSpace.
len—The length of virtual memory to be allocated.
constraints—The allocation constraints are used now during the allocation and mapping of the virtual memory; the access constraints are stored in the Memory object and used later when it is accessed.

Throws:
InvalidAddressException is thrown if the microkernel is not able to map virtual memory for the specified parameters.
AllocationException is thrown if the microkernel experiences an allocation failure when attempting to allocate virtual memory for the specified mapping In the case of—this second constructor, a request is made to the microkernel to do the mapping, providing the length of memory, and allocation constraints. The microkernel returns the base virtual address and length mapped, which this constructor then uses to initialize this Memory object.

protected VirtualMemory (VirtualMemory superRange, Address offset, Address len) throws InvalidAddressException, AllocationException Parameters:
superRange—the super-range VirtualMemory object.
offset—The offset within the current VirtualMemory object for the new sub-range.
len—The length of the new sub-range.

Throws:
InvalidAddressException is thrown if either the offset or the offset+newLength is beyond the range of the VirtualMemory object from which the sub-range is being obtained.
AllocationException is thrown if the superrange Memory object is no longer valid.

This third protected constructor is used by sub-classes for their getSubRange( ) methods. This constructor invokes the corresponding protected constructor of the super-class, AccessibleMemory. Also, a private variable is initialized to indicate that this sub-range VirtualMemory object is not locked. Note that even if the super-range is locked, we do not initially indicate that the sub-range is locked. This is because we allow the microkernel to maintain a lock count on a particular range of addresses. This means that when we lock this sub-range, the lock count for it would be whatever count already accumulated for super-ranges plus one for this lock.

Sub-ranges are kept on private linked lists of the super-range VirtualMemory object, so that the unMap( ) method works as described.

unMap public void unMap( ) throws AllocationException

Throws:
AllocationException is thrown if the VirtualMemory object's linked list of sub-ranges is non-null, or if there is an internal failure of the unmapping done in the microkernel.

If the validity of the super-class Memory is set to null (already unmapped), this call returns immediately. This could happen if two threads were trying to call unMap at about the same time, and one got in ahead of the other.

Provided the VirtualMemory object is not a sub-range, the microkernel is called to do the unmap, specifying a base virtual address and a length. If it is just a sub-range, it is merely removed from its super-range's Vector of sub-ranges. Finally, the validity of the super-class Memory is set to false.

lock
    public long lock( ) throws AllocationException
    Returns:
        The number of bytes of this VirtualMemory object, if it was successfully locked; otherwise returns the number of bytes, starting at the beginning, that could have been locked, had it been a sub-range.
    Throws:
        AllocationException is thrown if the microkernel is not able to allocate physical memory to back the entire range of virtual memory, or if there is any other failure of the microkernel in getting this memory mapped in.
    If already locked, this method returns immediately. Otherwise, a request is made to the microkernel to get physical memory backing the entire range of virtual memory (if not already done), and to lock the mapping (or to increase the lock count in the case of a sub-range). The microkernel will need to keep track of multiple requests in possibly multiple virtual address spaces that have locked either virtual memory mappings or DMA mappings to physical memory (including a lock count of mappings that are locked to each physical page).
lockContiguous
    public void lockContiguous( ) throws AllocationException
    Returns:
        The number of bytes of this VirtualMemory object if it was successfully locked contiguously; otherwise if it would have been possible to lock a smaller sub-range (starting at the beginning of the object) the total number of bytes that could have been locked contiguously is returned.
    Throws:
        AllocationException is thrown if the VirtualMemory is already locked, but not contiguously, or if the microkernel is not able to allocate contiguous physical memory to back the entire range of virtual memory, or if there is any other failure of the microkernel in getting this memory mapped in. It should be noted that the microkernel may abort the operation and return a failure, resulting in this exception being thrown, if doing this contiguous locking would cause any locking of sub-ranges to be undone.
    If already locked contiguously, this method returns immediately. Otherwise, provided the VirtualMemory object is not already locked, a request is made to the microkernel to get contiguous physical memory backing the entire range of virtual memory, and to lock the mapping. The microkernel will need to keep track of multiple requests in possibly multiple virtual address spaces that have locked either virtual memory mappings or DMA mappings to physical memory (including a lock count of mappings that are locked to each physical page).
    The reason for not allowing the contiguous locking to be done when the VirtualMemory object is already locked non-contiguously is that there was probably a reason a client locked it non-contiguously, and it is thus better for the software that locked it non-contiguously to do the un-lock (and handle any side-effects of that temporary unlocking) rather than causing such side-effects to occur here.
unlock
    public void unlock( ) throws AllocationException
    Throws:
        AllocationException is thrown if there is some failure in the microkernel to unlock the mapping.
    If the VirtualMemory object is already unlocked, this method returns immediately. Note that this causes the microkernel to decrement its lock count for this whole range; it does not affect any sub-ranges that may be locked.
getPhysicalMemory
    public PhysicalMemory [ ] getPhysicalMemory ( ) throws AllocationException
    Returns:
        An array of PhysicalMemory objects to which this VirtualMemory object is mapped (array order is for increasing virtual address), if this VirtualMemory object is locked (via either lock( ) or lockContiguons( )); otherwise, if this VirtualMemory object is not locked, this method returns null.
    Throws:
        AllocationException is thrown if there is any failure of the microkernel in obtaining the information regarding the underlying physical memory (array of base addresses and lengths).
    If the VirtualMemory object is not locked, null is returned. Otherwise, if the PhysicalMemory objects have already been obtained for this VirtualMemory object (reference is kept in a private field of the VirtualMemory object), a reference to these pages is simply returned. Otherwise, first a request is made to the microkernel to obtain arrays of base physical addresses and lengths. Then, using the information obtained from the microkernel, each PhysicalMemory object is constructed. Before the array of PhysicalMemory objects is returned, reference to it is kept in a private field of this VirtualMemory object, so that further requests can be handled without involving the microkernel (as long as the VirtualMemory stays locked).
getCacheMode
    public int getcacheMode( )
    Returns:
        The cache mode, either MainMemory.CACHE_MODE_INHIBITED, MainMemory.CACHE_MODE_AMBIGUOUS, MainMemory.CACHE_MODE_WRITE_THROUGH, or MainMemory.CACHE_MODE_COPY_BACK.
    Note that this method allows a bus manager to determine how the virtual memory is cached if the bus manager did not record how it had specified the virtual memory to be cached, or if CACHE_MODE_DEFAULT had been specified by setCacheMode( ), and now the bus manager wants to know how exactly it was cached as default.
setCacheMode
    public void setcacheMode(int mode)
    Parameters:
        mode—Set to one of (see MainMemory): CACHE_MODE_DEFAULT, CACHE_MODE_INHIBITED, CACHE_MODE_WRITE_THROUGH, or CACHE_MODE_COPY_BACK.
    This method allows the bus manager, which should know about cache coherency of various components of the specific platform it supports, to control the caching of virtual memory. For example, on platforms where a virtual memory cache is not coherent with DMA accesses, it would be necessary for the bus manager to temporarily set the cache mode to CACHE_MODE_INHIBITED, while DMA transfers are set up (or to call flushCache( ) first and somehow guarantee that the CPU(s) will not access the virtual memory while DMA is done).
    Specifically, this method requests the following, depending upon the particular value of mode:
        CACHE_MODE_DEFAULT—Cache this range of virtual memory according to what the default is for this type of virtual memory, taking into account the caching requirements of the underlying physical memory. Also, note that if this range of virtual memory encompasses different sub-ranges that must be cached differently, this is handled, so that then entire range of virtual memory is correctly cached. Whenever possible, this mode will result in caching being done to yield the greatest possible efficiency.

CACHE_MODE_INHIBITED—If there is a cache, and if it can be uncached, it is uncached. If this is not possible, but is possible on a sub-range, it is done on any such sub-ranges. Otherwise, nothing is done.

CACHE_MODE_WRITE_THROUGH—If there is a cache, and if it can be converted to write-through mode, it is so converted. If this is not possible, but is possible on a sub-range, it is done on any such sub-ranges. Otherwise, nothing is done.

CACHE_MODE_COPY_BACK—If there is a cache, and if it can be converted to copy-back mode, it is so converted. If this is not possible, but is possible on a sub-range, it is done on any such sub-ranges. Otherwise, nothing is done.

flushCache public void flushCache( )

Simply flushes the cache if the virtual memory is cached. If it is not cached, this method does nothing. Note that the caches are flushed for the entire range of addresses of this object.

The VirtualMemory class defines the following native methods. Each of these native methods is implemented by functionality in the microkernel. For more details, refer to the Microkernel Interfaces section.

private native int physmap(long[ ] ret, int vasid, long[ ] paddrs,long[ ] sizes, long minaddr, long maxaddr, int align, int cacheMode, boolean locked, boolean waitformem);

private native int map(long[ ] ret, int vasid, long size, long minaddr,long maxaddr, int align, int cacheMode, boolean locked,boolean waitformem);

private native int unmap(int vasid, long base, long len,int howcreated); private native int dolock(long[ ] ret, int vasid, long base, long len);

private native int dolockcontig(long[ ] ret, int vasid, long base, long len); private native int dounlock(int vasid, long base, long len);

private native int getphys(int[ ] ret, int vasid, long[ ] pBase, long[ ] pLen, long base, long len);

private native void setcachemode(int vasid, long base, long len, int mode);

private native int getcachemode(int vasid, long base, long len);

private native void flushcache(int vasid, long base, long len);

DMAAddressSpace public final class DMAAddressSpace extends AddressSpace

The DMAAddressSpace is not really used by the memory classes themselves, since it is assumed that a machine only has one DMA address space, but it is provided for completeness, and for use outside of the memory classes, with a MemoryDescriptor, by various bus managers.

Besides the constructor, the following public string is defined:

public final static String name="dma";

DMAAddressSpace public DMAAddressSpace (ExpansionBus b)

This constructor first calls the constructor of the super-class, AddressSpace, specifying the ExpansionBus argument and the String defined above, so that they may be used by the public methods, getExpansionBus( ) and getName( ) of AddressSpace. Then it calls the getAddressSize( ) and the alloc_id( ) native methods (see below) and supplies them to an protected initialization routine of AddressSpace, so that they may then be used by the public methods, getLowestAddress( ) getHighestAddress( ) and getID( ) of AddressSpace.

The DMAAddressSpace defines the following native methods, implemented in the microkernel, which provide the size of addresses (in bits) and an ID for the address space, respectively.

private native int getAddressSize( );

private native int alloc_id( );

DMAMemory

Public class DMAMemory extends Memory

The DMAMemory object represents memory that can be accessed only via addressing external to the CPUs on some DMA channel. These DMA addresses are mapped via the DMA hardware to physical memory addresses. Thus, a DMAMemory object is always mapped to PhysicalMemory objects. Since DMAMemory cannot be accessed either directly or indirectly by the CPU(s), DMAMemory is neither a sub-class of AccessibleMemory nor MainMemory. Rather, DMAMemory is a direct sub-class of Memory.

When constructing a DMAMemory object, note that sometimes it is not possible to map the entire amount of memory specified, so the getMemLength( ) method of Memory should be called to determine the actual amount of memory mapped.

The following constructors and public methods are defined:

DMAMemory public DMAMemory (PhysicalMemory [ ] PMList, MemoryConstraints constraints) throws InvalidAddressException, AllocationException, NotSupportedException Parameters:

PMList—An array of PhysicalMemory objects that are to be mapped into DMAmemory in the order as they appear in the array.

constraints—The allocation constraints are used now during the allocation and mapping of the virtual memory; the access constraints are ignored, since it is not possible for a CPU to access DMAMemory.

Throws:

NotSupportedException is throw if a call to the microkernel indicates that DMA is not supported on this platform.

InvalidAddressException is thrown if the constructor called for the super-class, Memory, throws InvalidAddressException. if the specified length does not meet the allocation constraints, if the specified PhysicalMemory objects together cannot meet the allocation constraints, or if any of the PhysicalMemory objects is invalid.

AllocationException is thrown if the specified PhysicalMemory objects are not aligned so that they can be mapped to contiguous ranges of the DMAMemory object, or if there is any other internal error of the microkernel that prevents it from making the specified mapping.

A request is made to the microkernel to allocate the DMA mappings, providing the arrays of base physical addresses and lengths, and the allocation constraints. The microkernel returns the base DMA address and the length of DMA mapped, and then uses this information to initialize the Memory super-class.

public DMAMemory(Address len, MemoryConstraints constraints) throws InvalidAddressException, AllocationException, NotSupportedException
    Parameters:
        len—The length of DMAMemory to be allocated.
        constraints—Only the allocation constraints are used; the access constraints are ignored
    Throws:
        NotSupportedException is throw if a call to the microkernel indicates that DMA is not supported on this platform.
        InvalidAddressException is thrown if the constructor called for the super-class, Memory, throws InvalidAddressException, or if the specified length does not meet the allocation constraints.
        AllocationException is thrown if there is any other internal error of the microkernel that prevents it from making the specified mapping.

A request is made to the microkernel to allocate the DMA mappings, providing the length to allocate and the allocation constraints. The microkernel returns the base DMA address and the length of DMA mapped, and then uses this information to initialize the Memory super-class.

private DMAMemory(DMAMemory superRange, Address offset, Address len) throws InvalidAddressException, AllocationException
    Parameters:
        superRange—the super-range DMA object.
        offset—The offset within the current DMA object for the new sub-range.
        len—The length of the new sub-range.
    Throws:
        InvalidAddressException is thrown if either the offset or the offset+newLength is beyond the range of the DMAMemory object from which the sub-range is being obtained, or if the wad sub-range does not meet the allocation constraints of the original DMAMemory object.
        AllocationException is thrown if the superrange Memory object is no longer valid.

This private constructor is used by the getSubRange( ) method. This constructor invokes the corresponding protected constructor of the super-class, Memory.
toString
    public String toString( )
    Returns:
        A string representing this DMAMemory object.
unMap
    public void unMap( ) throws AllocationException
    Throws:
        AllocationException is thrown if the DMAMemory object's linked list of sub-ranges is non-null, or if there is an internal failure of the unmapping done in the microkernel.

If the validity of the super-class Memory is set to null (already unmapped), this call returns immediately. This could happen if two threads were trying to call the unMap( ) method at about the same time, and one got in ahead of the other. Provided the DMAMemory object is not a sub-range, the microkernel is called to do the DMA deallocation, specifying a base DMA address and a length. If it is just a sub-range, it is merely removed from its superrange's Vector of sub-range. Finally, the validity of the super-class Memory is set to false.
getPhysicalMemory
    public PhysicalMemory[ ] getPhysicalMemory( ) throws Allocation Exception
    Returns:
        An array of PhysicalMemory objects to which this DMAMemory is mapped (array order is for increasing DMA address).
    Throws:
        AllocationException is thrown if there is any failure of the microkernel in obtaining the information regarding the underlying physical memory (array of base addresses and lengths).

If the PhysicalMemory objects have already been obtained for this DMAMemory object (reference is kept in a private field of the DMAMemory object), a reference to these pages is simply returned. Otherwise, first a request is made to the microkernel to obtain arrays of base physical addresses and lengths. Then, using the information obtained from the microkernel, each PhysicalMemory object is constructed. Before the array of PhysicalMemory objects is returned, reference to it is kept in a private field of this DMAMemory object, so that further requests can be handled without involving the microkernel.
getSubRange
    public Memory getSubRange(Address offset, Address newLength) throws InvalidAddressException
    Parameters:
        offset—The offset within the current DMAMemory object for the new sub-range.
        newLength—The length of the new sub-range.
    Returns:
        A DMAMemory object which is the specified sub-range.
    Throws:
        InvalidAddressException is thrown if either the offset or the offset+newLength is beyond the range of the VirtualMemory object from which the sub-range is being obtained.
        AllocationException is thrown if the superrange Memory object is no longer valid.

This method merely calls the private DMAMemory constructor that is used to construct sub-ranges.
toString
    public String toString( )
    Returns:
        A string representing this DMAMemory object.

The DMAMemory class defines the following native methods. Each of these native methods is implemented by functionality in the microkernel.
    private native boolean supported( );
    private native int physmap(long[ ] ret, long[ ] paddrs, long[ ] sizes,long minaddr, long maxaddr, int align, boolean waitformem);
    private native int map(long[ ] ret, long size, long minaddr, long maxaddr, int align, boolean waitformem);
    private native int unmap(long base, long len);
    private native int getphys(into ret, long[ ] pBase, long[ ] pLen,long base, long len);
VirtualIOMemory
    public abstract class VirtualIOMemory extends VirtualMemory The following constructors and public methods are defined:

VirtualIOMemory protected VirtualIOMemory (int vasid, PhysicalMemory[ ] PMList, Memoryconstraints constraints) throws InvalidAddressException, AllocationException protected VirtualIOMemory(int vasid, Address len, MemoryConstraints constraints) throws InvalidAddressException, AllocationException protected VirtualIOMemory (VirtualIOMemory superrange, Address offset, Address len) throws InvalidAddressException, Allocation Exception Each of these three protected constructors is only used by sub-classes, and merely invoke the corresponding constructor of VirtualMemory. Refer to VirtualMemory for more details.

The VirtualIOMemory abstract class currently provides no additional functionality but is merely defined in case there are ever common methods between SwappedVirtualIOMemory and UnSwappedVirtualIOMemory. Currently, this class only defines three protected constructors which merely invoke the corresponding constructors of the superclass VirtualMemory.

SwappedVirtualIOMemory public class SwappedVirtualIOMemory extends VirtualIOMemory The following constructors and public methods are defined:

SwappedVirtualIOMemory public SwappedVirtualIOMemory (int vasid, PhysicalMemory[ ] PMList, MemoryConstraints constraints) throws InvalidAddressException, AllocationException, NotSupportedException public SwappedVirtualIOMemory (int vasid, Address len, MemoryConstraints constraints) throws InvalidAddressException, AllocationException, NotSupportedException private SwappedVirtualIOMemory (SwappedVirtualIOMemory superrange, Address offset, Address len) throws InvalidAddressException, AllocationException As long as SwappedVirtualIOMemory is supported on this platform, each of these three constructors merely invoke the corresponding constructor of VirtualIOMemory, which in turn invokes the corresponding constructor of VirtualMemory. Refer to VirtualMemory for more details. If SwappedVirtualIOMemory is not supported on this platform, NotSupportedException is thrown.

getSubRange public SwappedVirtualIOMemory getsubRange(Address offset, Address newLength) throws InvalidAddressException, AllocationException Parameters:

offset—The offset within the current SwappedVirtualIOMemory object for the new sub-range.

newLength—The length of the new sub-range.

Returns:

A SwappedVirtualIOMemory object which is the specified sub-range.

Throws:

InvalidAddressException is thrown if either the offset or the offset+newlength is beyond the range of the SwappedVirtualIOMemory object from which the sub-range is being obtained, or if the Woposed sub-range does not meet the allocation constraints of the original SwappedVirtualIOMemory object.

AllocationException is thrown if the superrange Memory object is no longer valid.

This method merely invokes the third constructor method of SwappedVirtualIOMemory, which eventually invokes the third constructor method of VirtualMemory to construct the sub-range.

toString public String toString( )

Returns:

A string representing this SwappedVirtualIOMemory object.

The SwappedVirtualIOMemory class defines the following native methods corresponding to the abstract access methods that are defined in AccessibleMemory. Each of these native methods is implemented by functionality in the microkernel, which must handle both the fact that the memory is byteswapped, and that it is I/O memory which may, depending upon the platform, require additional operations to deal with the fact that I/O memory may not be coherent with other system memory.

protected native boolean supported( );

protected native int ncksum(long adr, long len);

protected native void nSetByte(long adr, byte x);

protected native void nSetShort(long adr, short x);

protected native void nSetInt(long adr, int x);

protected native void nSetLong(long adr, long x);

protected native void nSetBytes(long adr, byte bytes[ ], int bytesOffset, int length);

protected native void nSetIntArray(long adr, byte bytes[ ], int bytesoffset, int length_int);

protected native byte nGetByte(long adr);

protected native short nGetshort(long adr);

protected native int nGetInt(long adr);

protected native long nGetLong(long adr);

protected native void nGetBytes(long adr, byte bytes[ ], int bytesoffset, int length);

protected native void nGetintArray(long adr, byte bytes[ ], int bytesOffset, int length_int);

protected native void nRegisterSource(long adr1, long len);

protected native void nCopy(long adr2, long len, int copyID);

UnSwappedVirtualIOMemory public class UnSwappedVirtualIOMemory extends VirtualIOMemory UnSwappedVirtualIOMemory public UnSwappedVirtualIOMemory (int vasid, PhysicalMemory [ ] PMList, Memoryconstraints constraints) throws InvalidAddressException, AllocationException, NotSupportedException public UnSwappedVirtualIOMemory (int vasid, Address len, MemoryConstraints constraints) throws InvalidAddressException, AllocationException, NotSupportedException private UnswappedvirtualIOMemory (UnswappedVirtualIOMemory superrange, Address offset, Address len) throws InvalidAddressException, AllocationException As long as UnSwappedVirtualIOMemory is supported on this platform, each of these three constructors merely invoke the corresponding constructor of VirtualIOMemory, which in turn invokes the corresponding constructor of VirtualMemory. Refer to VirtualMemory for more details. If UnSwappedVirtualIOMemory is not supported on this platform, NotSupportedException is thrown.

getSubRange public UnswappedvirtualIOMemory getSubRange (Address offset, Address newLength) throws InvalidAddressException, AllocationException Parameters:

offset—The offset within the current UnswappedVirtualIOMemory object for the new sub-range.

newLength—The length of the new sub-range.

Returns:

A UnSwappedVirtualIOMemory object which is the specified sub-range.

Throws:

InvalidAddressException is thrown if either the offset or the offset+newLength is beyond the range of the UnSwappedVirtualIOMemory object from which the sub-range is being obtained, or if the proposed sub-range does not meet the allocation constraints of the original UnSwappedVirtualIOMemory object.

AllocationException is thrown if the superrange Memory object is no longer valid.

This method merely invokes the third constructor method of UnSwappedVirtualIOMemory which eventually invokes the third constructor method of VirtualMemory to construct the sub-range.

toString public String toString( )

Returns:

A string representing this UnswappedVirtualIOMemory object.

The UnSwappedVirtualIOMemory class defines the following native methods corresponding to the abstract access methods that are defined in AccessibleMemory. Each of these native methods is implemented by functionality in the microkernel, which must handle the fact that it is I/O memory which may, depending upon the platform, require additional operations to deal with the fact that I/O memory may not be coherent with other system memory. Unlike the corresponding native methods of UnSwappedVirtualIOMemory the native methods here do not have to deal with byte-swapping.

protected native boolean supported( );
 protected native int ncksum(long adr, long len);
 protected native void nSetByte(long adr, byte x);
 protected native void nSetShort(long adr, short x);
 protected native void nSetInt(long adr, int x);
 protected native void nSetLong(long adr, long x);
 protected native void nSetBytes(long adr, byte bytes[ ], int bytesOffset, int length);
 protected native void nSetIntArray(long adr, byte bytes[ ], int bytesOffset, int length_int);
 protected native byte nGetByte (long adr);
 protected native short nGetShort(long adr);
 protected native int nGetInt(long adr);
 protected native long nGetLong(long adr);
 protected native void nGetBytes(long adr, byte bytes[ ], int bytesOffset, int length);
 protected native void nGetIntArray(long adr, byte bytes[ ], int bytesoffset, int length_int);
 protected native void nRegisterSource(long adr1, long len);
 protected native void nCopy(long adr2, long len, int copyID);

VirtualRegularMemory public abstract class VirtualRegularMemory extends VirtualMemory The following constructors and public methods are defined:

VirtualRegularMemory protected VirtualRegularMemory (int vasid, PhysicalMemory [ ] PMList, MemoryConstraints constraints) throws InvalidAddressException, Allocation Exception protected VirtualRegularMemory(int vasid, Address len, MemoryConstraints constraints) throws InvalidAddressException, AllocationException protected VirtualRegularMemory (VirtualRegularMemory superrange, Address offset, Address len) throws InvalidAddressException, AllocationException Each of these three protected constructors is only used by sub-classes, and merely invoke the corresponding constructor of VirtualMemory. Refer to VirtualMemory for more details.

The VirtualRegularMemory abstract class currently provides no additional functionality, but is merely defined in case there are ever common methods between SwappedVirtualRegularMemory and UnswappedVirtualRegularMemory. Currently, this class only defines three protected constructors which merely invoke the corresponding constructors of the super-class VirtualMemory.

swappedvirtualRegularMemory public class SwappedVirtualRegularMemory extends VirtualRegularMemory The following constructors and public methods are defined:

SwappedVirtualRegularMemory public SwappedVirtualRegularMemory (int vasid, PhysicalMemory [ ] PMList, MemoryConstraint constraints) throws InvalidAddressException, Allocation Exception, NotSupportedException public SwappedVirtualRegularMemory (int vasid, Address len, MemoryConstraints constraints) throws InvalidAddressException, AllocationException, NotSupportedException private SwappedVirtualRegularMemory (SwappedVirtualRegularMemory superrange, Address offset, Address len) throws InvalidAddressException, AllocationException As long as SwappedVirtualRegularMemory is supported on this platform, each of these three constructors merely invoke the corresponding constructor of VirtualRegularMemory, which in turn invokes the corresponding constructor of VirtualMemory. Refer to VirtualMemory for more details. If SwappedVirtualRegularMemory is not supported on this platform, NotSupportedException is thrown.

getSubRange public SwappedVirtualRegularMemory getSubRange (Address offset, Address newLength) throws InvalidAddressException, AllocationException Parameters:

offset—The offset within the current SwappedVirtualRegularMemory object for the new sub-range.

newLength—The length of the new sub-range.

Returns:

A SwappedVirtualRegularMemory object which is the specified sub-range.

Throws:
>InvalidAddressException is thrown if either the offset or the offset+newLength is beyond the range of the SwappedVirtualRegularMemory object from which the sub-range is being obtained, or if the proposed sub-range does not meet the allocation constraints of the original SwappedVirtualRegularMemory object.
>AllocationException is thrown if the superrange Memory object is no longer valid.

This method merely invokes the third constructor method of SwappedVirtualRegularMemory, which eventually invokes the third constructor method of VirtualMemory to construct the sub-range.

toString
>public String toString( )
>Returns:
>>A string representing this SwappedVirtualRegularMemory object.

The SwappedVirtualRegularMemory class defines the following native methods corresponding to the abstract access methods that are defined in AccessibleMemory. Each of these native methods is implemented by functionality in the microkernel, which must handle both the fact that the memory is byte-swapped.

>protected native boolean supported( );
>protected native int ncksum(long adr, long len);
>protected native void nSetByte(long adr, byte x);
>protected native void nSetShort(long adr, short x);
>protected native void nSetInt(long adr, int x);
>protected native void nSetLong(long adr, long x);
>protected native void nSetBytes(long adr, byte bytes[ ], int bytesOffset, int length);
>protected native void nSetIntArray(long adr, byte bytes[ ], int bytesOffset, int length_int);
>protected native byte nGetByte(long adr);
>protected native short nGetShort(long adr);
>protected native int nGetInt(long adr);
>protected native long nGetLong(long adr);
>protected native void nGetBytes(long adr, byte bytes[ ], int bytesOffset, int length);
>protected native void nGetIntArray(long adr, byte bytes[ ], int bytesOffset, int length_int);
>protected native void nRegisterSource(long adr1, long len);
>protected native void nCopy(long adr2, long len, int copyID);

UnSwappedVirtualRegularMemory
>public class UnSwappedVirtualRegularMemory extends VirtualRegularMemory The following constructors and public methods are defined:

UnSwappedVirtualRegularMemory
>public UnSwappedVirtualRegularMemory (int vasid, PhysicalMemory [ ] PMList, MemoryConstraints constraints) throws InvalidAddressException, AllocationException, NotSupportedException
>public UnSwappedVirtualRegularMemory (int vasid, Address len,MemoryConstraints constraints) throws InvalidAddressException, AllocationException, NotSupportedException
>private UnSwappedVirtualRegularMemory (UnSwappedVirtualRegularMemory superrange, Address offset, Address len) throws InvalidAddressException, AllocationException As long as UnSwappedVirtualRegularMemory is supported on this platform, each of these three constructors merely invoke the corresponding constructor of VirtualRegularMemory, which in turn invokes the corresponding constructor of VirtualMemory. Refer to VirtualMemory for more details. If UnSwappedVirtualRegularMemory is not supported on this platform, NotSupportedException is thrown.

getSubRange
>public UnSwappedVirtualRegularMemory getSubRange (Address offset, Address newLength) throws InvalidAddressException, AllocationException
>Parameters:
>>offset—The offset within the current UnSwappedVirtualRegularMemory object for the new sub-range.
>newLength—The length of the new sub-range.
>Returns:
>>A UnSwappedVirtualRegularMemory object which is the specified sub-range.
>Throws:
>>InvalidAddressException is thrown if either the offset or the offset+newLength is beyond the range of the UnSwappedVirtualRegularMemory object from which the sub-range is being obtained, or if the proposed sub-range does not meet the allocation constraints of the original UnSwappedVirtualRegularMemory object.
>>AllocationException is thrown if the superrange Memory object is no longer valid.

This method merely invokes the third constructor method of UnSwappedVirtualRegularMemory, which eventually invokes the third constructor method of VirtualMemory to construct the sub-range.

toString
>public String toString( )
>Returns:
>>A string representing this UnSwappedVirtualRegularMemory object.

The UnSwappedVirtualRegularMemory class defines the following native methods corresponding to the abstract access methods that are defined in AccessibleMemory. Unlike the corresponding native methods of SwappedVirtualRegularMemory, the native methods here do not have to deal with byte-swapping.

>protected native boolean supported( );
>protected native int ncksum(long adr, long len);
>protected native void nSetByte(long adr, byte x);
>protected native void nSetShort(long adr, short x);
>protected native void nSetInt(long adr, int x);
>protected native void nSetLong(long adr, long x);
>protected native void nSetBytes(long adr, byte bytes[ ], int bytesOffset, int length);
>protected native void nSetIntArray(long adr, byte bytes[ ], int bytesOffset, int length_int);
>protected native byte nGetByte(long adr);
>protected native short nGetShort(long adr);
>protected native int nGetInt(long adr);
>protected native long nGetLong(long adr);
>protected native void nGetBytes(long adr, byte bytes[ ], int bytesOffset, int length);
>protected native void nGetIntArray(long adr, byte bytes( ), int bytesOffset, int length_int);
>protected native void nRegisterSource(long adr1, long len);

protected native void nCopy(long adr2, long len, int copyID);

PortIOAddressSpace public final class PortIOAddressSpace extends AddressSpace

The PortIOAddressSpace is not really used by the memory classes themselves, since it is assumed that a machine only has one port I/O address space, but it is provided for completeness, and for use outside of the memory classes, with a MemoryDescriptor, by various bus managers.

Besides the constructor, the following public string is defined:

public final static String name="portio";

PortIOAddressSpace public PortIOAddressSpace (ExpansionBus b)

This constructor first calls the constructor of the super-class, AddressSpace, specifying the ExpansionBus argument and the String defined above, so that they may be used by the public methods, getExpansionBus( ), and getName( ) of AddressSpace. Then it calls the getAddressSize( ) and the alloc_id( ) native methods (see below) and supplies them to an protected initialization routine of AddressSpace, so that they may then be used by the public methods, getLowestAddress( ), getHighestAddress( ), and getID( ) of AddressSpace.

The PortIOAddressSpace defines the following native methods, implemented in the microkernel, which provide the size of addresses (in bits) and an ID for the address space, respectively.

private native int getAddressSize( );
private native int alloc_id( );

PortIOMemory public abstract class PortIOMemory extends AccessibleMemory

The PortIOMemory abstract class provides some minor functionality that is common between SwappedPortIOMemory and UnSwappedPortIOMemory.

The following constructors and public methods are defined:

PortIOMemory protected PortIOMemory (Address p, Address len, MemoryConstraints constraints)

Parameters:
p-BaseAddress
len-length
constraints—Memory Constraints

This constructor merely calls the protected constructor of the super-class, AccessibleMemory.

setCacheMode public void setCacheMode(int mode)

Parameters:
mode—Requested cache mode.

This method does nothing; regardless what cache mode is specified, no caching is supported for PortIOMemory, so the mode is always kept as CACHE_MODE_INHIBITED.

getCacheMode public int getCacheMode( )

Returns:
Cache mode.
This method always returns CACHE_MODE_INHIBITED.

flushCache public void flushCache( )

Since there is no cache to flush, this method does nothing.

SwappedPortIOMemory public class SwappedPortIOMemory extends PortIOMemory

The following constructors and public methods are defined:

SwappedPortIOMemory public SwappedPortIOMemory(Address p, Address len, MemoryConstraints constraints)

Parameters:
p-BaseAddress
len-length
constraints—Memory Constraints

This constructor merely calls the protected constructor of the super-class, PortIOMemory.

getSubRange protected getSubRange(Address offset, Address newLength) throws InvalidAddressException, AllocationException Parameters:
offset—The offset within the current SwappedPortIOMemory object for the new sub-range.
newLength—The length of the new sub-range.

Returns:
A Memory object (actually specifically a SwappedPortIOMemory object) which is the specified sub-range.

Throws:
InvalidAddressException is thrown if either the offset or the offset+newLength is beyond the range of the SwappedPortIOMemory object from which the sub-range is being obtained, or if the proposed sub-range does not meet the constraints (e.g. alignment) of the original SwappedPortIOMemory object.
AllocationException is thrown if the superrange Memory object is no longer valid.

This method merely invokes the constructor method of SwappedPortIOMemory.

toString public String toString( )

Returns:
A string representing this SwappedPortIOMemory object.

The SwappedPortIOMemory class defines the following native methods corresponding to the abstract access methods that are defined in AccessibleMemory. Each of these native methods is implemented by functionality in the microkernel, which must handle both the fact that the memory is byte-swapped, and that it is port memory.

protected native boolean supported( );
protected native int ncksum(long adr, long len);
protected native void nSetByte(long adr, byte x);
protected native void nSetShort(long adr, short x);
protected native void nSetInt(long adr, long x);
protected native void nSetLong(long adr, long x);
protected native void nSetBytes(long adr, byte bytes[ ], int bytesOffset, int length);
protected native void nSetIntArray(long adr, byte bytes[ ], int bytesOffset, int lengt_int);
protected native byte nGetByte(long adr);
protected native short nGetShort(long adr);
protected native int nGetInt(long adr);
protected native long nGetLong(long adr);
protected native void nGetBytes(long adr, byte bytes[ ], int bytesOffset, int length);

protected native void nGetIntArray(long adr, byte bytes[ ], int bytesOffset, int length_int);
protected native void nRegisterSource(long adr1, long len);
protected native void nCopy(long adr2, long len, int copyID);
UnSwappedPortIOMemory
    public class UnswappedPortIOMemory extends PortIOMemory
    The following constructors and public methods are defined:
UnswappedPortIOMemory
    public UnSwappedPortIOMemory(Address p, Address len, MemoryConstraints constraints)
    Parameters:
        p-BaseAddress
        len-Length
        constraints—Memory Constraints
    This constructor merely calls the protected constructor of the super-class, PortIOMemory.
getSubRange
    protected getSubRange(Address offset, Address newLength) throws InvalidAddressException
    Parameters:
        offset—The offset within the current UnSwappedPortIOMemory object for the new sub-range.
        newLength—The length of the new sub-range.
    Returns:
        A Memory object (actually specifically a UnSwappedPortIOMemory object) which is the specified sub-range.
    Throws:
        InvalidAddressException is thrown if either the offset or the offset+newLength is beyond the range of the UnSwappedPortIOMemory object from which the sub-range is being obtained, or if the proposed sub-range does not meet the constraints (e.g. alignment) of the original UnSwappedPortIOMemory object.
        AllocationException is thrown if the superrange Memory object is no longer valid.
    This method merely invokes the constructor method of UnswappedPortIOMemory.
toString
    public String toString( )
    Returns:
        A string representing this UnSwappedPortIOMemory object.
    The UnswappedPortIOMemory class defines the following native methods corresponding to the abstract access methods that are defined in AccessibleMemory. Each of these native methods is implemented by functionality in the microkernel, which must handle both the fact that the memory is port memory.
        protected native boolean supported( );
        protected native int ncksum(long adr, long len);
        protected native void nSetByte(long adr, byte x);
        protected native void nSetShort(long adr, short x);
        protected native void nSetInt(long adr, int x);
        protected native void nSetLong(long adr, long x);
        protected native void nSetBytes(long adr, byte bytes[ ], int bytesOffset, int length);
        protected native void nSetIntArray(long adr, byte bytes[ ], int bytesOffset, int length_int);
        protected native byte nGetByte(long adr);
        protected native short nGetShort(long adr);
        protected native int nGetInt(long adr);
        protected native long nGetLong(long adr);
        protected native void nGetBytes(long adr, byte bytes[ ], int bytesOffset, int length);
        protected native void nGetIntArray(long adr, byte bytes[ ], int bytesOffset, int length_int);
        protected native void nRegisterSource(long adr1, long len);
        protected native void nCopy(long adr2, long len, int copyID);
Microkernel Memory and DMA Methods
    DMA and Memory methods 80 and 82 of microkernel 62 consist entirely of the set of native methods of the various Java classes. Together, these native methods are contained in a library of functions for a particular microkernel, and each function of that library either handles the native method itself, or performs a system call to the microkernel to handle the native method.
PhysicalAddressSpace
    The PhysicalAddressSpace class defines the following native methods:
getAddressSize
    private native int getAddressSize( );
    Returns the number of bits of physical addresses
alloc_id
    private native int alloc_$id($ );
    Since it is assumed that there is only one physical address space, the microkernel simply returns 0.
PhysicalMemory
    The PhysicalMemory class defines the following native methods corresponding to the abstract cache management methods defined in MainMemory.
    The following native methods control caching of data associated with physical addresses on the particular platform.
setcachemode
    private native void setcachemode(long base, long len, int mode);
    This native method sets the caching for physical memory, starting at the physical address, base, and continuing for a length in bytes of len. The caching is set based upon the following possible values of mode (for any other values of mode, do nothing):
        CACHE_MODE_DEFAULT—Cache this range of physical memory according to what the default is for this type of physical memory on this platform. Note that, even on platforms that have physical address caches, some physical memory (e.g. I/O registers) may need to be uncached, and it is expected that the microkernel will make them uncached if they need to be uncached to be used correctly. Also, note that, if the range specified encompasses different types of physical memory that need to be treated differently, the microkernel is expected to cache different sub-ranges differently, if necessary, so that the entire range is cached correctly. Other than these restrictions, the microkernel should try to set up caching to effect the greatest efficiency that is correct. In other words, if caches can be used, while still maintaining data integrity, they should.
        CACHE_MODE_INHIBITED—If it is possible to cache this physical memory, and if it is possible to disable its caching, then disable its caching. Otherwise, do nothing. If this in not possible over the entire range, but is possible over one or more sub-ranges, do it at least over any such sub-ranges.

CACHE_MODE_WRITE_THROUGH—If it is possible to cache this physical memory, and if it is possible to set the caching to write-through mode, then set it as such. Otherwise, do nothing. If this is not possible over the entire range, but is possible over one or more sub-ranges, do it at least over any such sub-ranges.

CACHE_MODE_COPY_BACK—If it is possible to cache this physical memory, and if it is possible to set the caching to copy-back mode, then set it as such. Otherwise, do nothing. If this in not possible over the entire range, but is possible over one or more sub-ranges, do it at least over those sub-ranges.

getcachemode private native int getcachemode(long base, long len);

This native method gets the caching for physical memory, starting at the physical address, base, and continuing for a length in bytes of len. One of the following values is to be returned:

CACHE_MODE_AMBIGUOUS—If the entire range is not cached the same way, or if none of the following return values apply.

CACHE_MODE_INHIBITED—If there is no cache, or if there is a cache, but this physical memory range is now uncached.

CACHE_MODE_WRITE_THROUGH—If this range of physical memory is now cached in write-through mode.

CACHE_MODE_COPY_BACK—If this range of physical memory is now cached in copy-back mode.

flushcache private native void flushcache(long base, long len);

If any sub-range of this range of physical memory is cached in CACHE_MODE_COPY_BACK mode, flush any such caches if possible. If it is not possible to flush them, convert them to CACHE_MODE_INHIBITED. If even this is not possible, it is assumed that somehow the platform was designed so that DMA is always coherent with respect to any physical caches, and in those cases, it is fine for this method to do nothing.

VirtualAddressSpace

The VirtualAddressSpace class defines the following native methods:

getAddressSize private native int getAddressSize( );

Returns the number of bits of virtual addresses for this virtual address space (the one in which the calling thread is running).

alloc_id private native int alloc_id( );

Each virtual machine runs in a separate virtual address space (only one virtual address space on a machine with just one virtual machine). This method allows the microkernel to specify an ID (only the microkernel will interpret this ID) which can be used subsequently to identify the particular virtual address space for a mapping in native methods of the VirtualMemory class. The particular virtual address space is to be the one which the thread calling this native method is set up to use.

VirtualMemory

The VirtualMemory class defines the following native methods., which control virtual memory. If a platform does not really have virtual memory, then virtual memory is defined to be mapped (automatically) one-to-one to physical memory in such a way that the virtual address corresponding to a physical address is the same as that physical address.

The first three native methods map and unmap virtual memory. The first native method, physmap( ), sets up virtual memory mapped to an array of physical memory ranges, while the second native method, map( ), simply maps a specified amount of virtual memory, without specifying the physical memory to which it maps. The third native method, unmap( ), undoes the mappings that the other two methods create.

physmap private native int physmap(long[ ] ret, int vasid, long[ ] paddrs,long[ ] sizes, long minaddr, long maxaddr, int align, int cacheMode, boolean locked, boolean waitformem);

The particular virtual address space m which this mapping is to be done is specified by vasid, which the caller is to have obtained via a call to the alloc_vasid( ) native method of the VirtualAddressSpace class.

The physical memory to be mapped is specified via the arrays paddrs and sizes in such a way that the nth element of paddrs and the nth element of sizes specify the base physical address and length for a range of physical memory, respectively. These ranges of physical memory are to be mapped to increasingly higher virtual addresses in such a way that physical memory range n (as specified by nth elements of paddrs and sizes) is to be mapped to virtual addresses which are lower than the virtual addresses which map to physical memory range n+l. Furthermore, the virtual address ranges are to be contiguous, so that they form one virtual address range.

For this mapping, any range of virtual addresses can be used, except that all virtual addresses in the range must be greater than or equal to minaddr, and all virtual addresses in the range must be less than or equal to maxaddr. Also, the base virtual address is to be aligned as specified by align, which could have one of the following values:

MemoryConstraints.ALIGN_BYTE (0)—no alignment restriction.

MemoryConstraints.ALIGN_SHORT (1)—align to short.

MemoryConstraints.ALIGN_INT (2)—align to int.

MemoryConstraints.ALIGN_LONG (3)—align to long.

MemoryConstraints.ALIGN_CACHE (4)—align to cache line size.

MemoryConstraints.ALIGN_PAGE (5)—align to page size.

The virtual memory is to be cached as though cacheMode were specified for mode in a call to the native method, setcachemode( ).

If locked is true, the virtual memory mappings to the particular physical pages are to be locked as though the dolock( ) native method had been called.

If waitformem is true and it is currently not possible to complete the mapping request, due to a resource running out temporarily, then wait indefinitely to complete the request. Otherwise, do not wait.

If not all these constraints can be met, but they could be met for a smaller sub-range, which must start with the first range of physical memory, then do the mapping for that smaller sub-range. For example, if this platform does not really have virtual memory, and if the physical memory ranges are discontiguous, then obviously only the first range of physical memory can be mapped.

The base virtual address of the range is to be returned in ret[0] and the length of virtual memory mapped is to be returned in ret[1].

The possible return values are:
SUCCESS—The mapping was successful. Either the entire amount of physical memory was mapped, or at least a sub-range was mapped.
ADDRESS_FAILURE—There was some failure related to the physical addresses specified. For whatever reason those addresses are undefined physical memory or physical memory for which mappings can not be set up.
ALLOC_FAILURE—There was some other fatal failure in the attempt to create the mappings.

map private native int map(long[ ] ret, int vasid, long size, long minaddr,long maxaddr, int align, int cacheMode, boolean locked, boolean waitformem);

The particular virtual address space in which this mapping is to be done is specified by vasid, which the caller is to have obtained via a call to the alloc_vasid( ) native method of the VirtualAddressSpace class.

The amount of virtual memory to allocate is specified by size in bytes. For this mapping, any range of virtual addresses can be used, except that all virtual addresses in the range must be greater than or equal to minaddr, and all virtual addresses in the range must be less than or equal to maxaddr. Also, the base virtual address is to be aligned as specified by align, which could have one of the following values:

MemoryConstraints.ALIGN_BYTE (0)—no alignment restriction.
    MemoryConstraints.ALIGN_SHORT (1)—align to short.
    MemoryConstraints.ALIGN_INT (2)—align to int.
    MemoryConstraints.ALIGN_LONG (3)—align to long.
    MemoryConstraints.ALIGN_CACHE (4)—align to cache line size.
    MemoryConstraints.ALIGN_PAGE (5)—align to page size.

The virtual memory is to be cached as though cacheMode were specified for mode in a call to the native method, setcachemode( ).

If locked is true, the virtual memory mappings to the particular physical pages are to be locked as though the dolock( ) native method had been called.

If waitformem is true and it is currently not possible to complete the mapping request, due to a resource running out temporarily, then wait indefinitely to complete the request. Otherwise, do not wait.

If not all these constraints can be met, but they could be met for a smaller sub-range, which must start with the first range of physical memory, then do the mapping for that smaller sub-range.

The base virtual address of the range is to be returned in ret[0] and the length of virtual memory mapped is to be returned in ret[1].

The possible return values are:
SUCCESS—The mapping was successful. Either the entire amount of physical memory was mapped, or at least a sub-range was mapped.
ADDRESS_FAILURE—There was some failure related to the physical addresses specified. For whatever reason those addresses are undefined physical memory or physical memory for which mappings can not be set up.
ALLOC_FAILURE—There was some other fatal failure in the attempt to create the mappings.

unmap private native int unmap(int vasid, long base, long len,int howcreated);

The particular virtual address space in which this unmapping is to be done is specified by vasid, which the caller is to have obtained via a call to the alloc_vasid( ) native method of the VirtualAddressSpace class.

The virtual memory to be unmapped is that starting at base and having a length of len in bytes.

The howcreated parameter specifies how the virtual memory was mapped in the first place:
    CREATED_MAP—Created via physmap( ).
    CREATED_MALLOC—Created via map( ).

The possible return values are:
SUCCESS—The unmapping was a success. The entire range specified was unmapped.
ALLOC_FAILURE—There was some other fatal failure in the attempt to do the unmapping.

The next three native methods lock and unlock virtual memory mappings. The native method, dolock( ), locks virtual memory to particular physical memory without regard to the underlying physical memory being contiguous, while the native method, dolockcontig( ), does the locking to contiguous physical memory. The native method, unlock( ), unlocks the mappings that the other two methods lock.

dolock private native int dolock(long[ ] ret, int vasid, long base, long len);

The particular virtual address space in which this locking is to be done is specified by vasid, which the caller is to have obtained via a call to the alloc_vasid( ) native method of the VirtualAddressSpace class.

The virtual memory to be locked is that starting at base and having a length of len in bytes.

When a range of virtual memory is locked, it means that the microkernel cannot change the identity of the underlying physical memory. Thus, while locked, a particular range of virtual memory always maps to the same range of physical memory. It should be noted that the microkernel needs to maintain a lock count, such that each call to lock a particular range must be undone by as many calls to the dounlock( ) native method.

If the locking is not successful, this native method will not cause any locking of a partial range to be done. If the locking was successful, ret[0] will be the total number of bytes of the range that are locked (the entire length of the range). If the locking was not successful, but if it would have been possible to lock a sub-range starting at the beginning of the range, then ret[0] is the length of that sub-range.

The possible return values are:
SUCCESS—The locking was a success. The entire range specified was locked.
NOT_ALL_LOCKED—it would not be possible to lock the entire specified range, but it would be possible to lock a smaller sub-range starting at the beginning, whose length is ret[0].
ALLOC_FAILURE—There was some other fatal failure in the attempt to do the unmapping.

dolockcontig private native int dolockcontig(long[ ] ret, int vasid, long base, long len);

The particular virtual address space in which this locking is to be done is specified by vasid, which the caller is to have obtained via a call to the alloc_vasid( ) native method of the VirtualAddressSpace class.

The virtual memory to be locked is that starting at base and having a length of len in bytes.

When a range of virtual memory is locked, it means that the microkernel cannot change the identity of the underlying physical memory. Thus, while locked, a particular range of virtual memory always maps to the same range of physical memory. It should be noted that the microkernel needs to maintain a lock count, such that each call to lock a particular range must be undone by as many calls to the dounlock( ) native method.

As opposed to the dolock( ) native method, this particular native method is to do the locking so that the entire range of virtual addresses map to contiguous physical memory. In order to do this, the microkernel may need to remap portions of this virtual range. Note, though, that if this remapping violates any locking already done via dolock( ) or dolockcontig( ), then this dolockcontig( ) call is to be failed (with NOT_ALL_LOCKED).

If the locking is not successful, this native method will not cause any locking of a partial range to be done. If the locking was successful, ret[0] will be the total number of bytes of the range that are locked (the entire length of the range). If the locking was not successful, but if it would have been possible to lock a sub-range starting at the beginning of the range, then ret[0] is the length of that sub-range.

The possible return values are:
SUCCESS—The locking was a success. The entire range specified was locked contiguously.
NOT_ALL_LOCKED—it would not be possible to lock the entire specified range, but it would be possible to lock contiguously a smaller sub-range starting at the beginning, whose length is ret[0].
ALLOC_FAILURE—There was some other fatal failure in the attempt to do the unmapping.

dounlock
   private native int dounlock(int vasid, long base, long len);

The particular virtual address space in which this unlocking is to be done is specified by vasid, which the caller is to have obtained via a call to the alloc_vasid( ) native method of the VirtualAddressSpace class.

The virtual memory to be unlocked is that starting at base and having a length of len in bytes. This call decrements the lock count for the range which had been incremented by either the dolock( ) or the dolockcontig( ) native methods.

The possible return values are:
SUCCESS—The unmapping was a success. The entire range specified was unlocked.
ALLOC_FAILURE—There was some other fatal failure in the attempt to do the unlocking.

getphys
   private native int getphys(into ret, int vasid, long[ ] pBase, long[ ] pLen, long base, long len);

Provided the virtual memory is first locked, it is guaranteed that the identity of the underlying physical memory will remain the same. A call to the getphys( ) native method is used to obtain the underlying physical memory.

The particular virtual address space in which this operation is to be done is specified by vasid, which the caller is to have obtained via a call to the alloc_vasid( ) native method of the VirtualAddressSpace class.

The base of the range of virtual memory is specified by base, and the length of the range by len in bytes.

If the virtual memory is not locked, this call does nothing and simply returns FAILURE.

The physical memory is to be specified in the supplied arrays pBase and pLen, such that the pBase[0] and pLen[0] are the base and length of the physical memory that starts mapping the beginning of the virtual memory, and such that (pBase[n+1], pLen[n+1]) specifies physical memory to which a higher range of virtual addresses is mapped than the range of virtual addresses that map the physical memory range specified by (pBase[n], pLen(n)).

It is not possible for the caller to know how many discontiguous ranges of physical memory map this virtual memory range, so it is possible that the supplied arrays for pBase and pLen may be too small. If this is the case, the microkernel is to return ARRAY_TOO_SMALL and specify the number of elements needed in the array in ret[0].

If this call is successful, the number of bits of the physical memory on this platform is specified in ret[1].

The next native methods control caching of data associated with virtual addresses on the particular platform.

setcachemode
   private native void setcachemode(int vasid, long base, long len, int mode);

The particular virtual address space in which this operation is to be done is specified by vasid, which the caller is to have obtained via a call to the alloc_vasid( ) native method of the VirtualAddressSpace class.

This native method sets the caching for virtual memory, starting at the virtual address, base, and continuing for a length in bytes of len. The caching is set based upon the following possible values of mode (for any other values of mode, do nothing):

CACHE_MODE_DEFAULT—Cache this range of virtual memory according to what the default is for this type of virtual memory on this platform. Note that, even on platforms that have virtual address caches, depending upon the underlying physical memory mapped, the virtual memory mapping some physical memory (e.g. I/O-registers) may need to be uncached, and it is expected that the microkernel will make these virtual memory mappings uncached if they need to be uncached to be used correctly. Also, note that if the range specified encompasses virtual memory mapped to different tppes of physical memory that need to be treated differently, the microkernel is expected to cache different sub-ranges differently, if necessary, so that the entire range is cached correctly. Other than these restrictions, the microkernel should try to set up caching to effect the greatest efficiency that is correct. In other words, if caches can be used, while still maintaining data integrity, they should.

CACHE_MODE_INHIBITED—If it is possible to cache this virtual memory, and if it is possible to disable its caching, then disable its caching. Otherwise, do nothing.

If this in not possible over the entire range, but is possible over one or more sub-ranges, do it at least over any such sub-ranges.

CACHE_MODE_WRITE_THROUGH—If it is possible to cache this virtual memory, and if it is possible to set the cache to write-through mode, then set it as such. Otherwise, do nothing. If this in not possible over the entire range, but is possible over one or more sub-ranges, do it at least over any such sub-ranges.

CACHE_MODE_COPY_BACK—If it is possible to cache this virtual memory, and if it is possible to set the caching to copy-back mode, then set it as such. Otherwise, do nothing. If this in not possible over the entire range, but is possible over one or more sub-ranges, do it at least over those sub-ranges.

getcachemode
   private native int getcachemode(int vasid, long base, long len);

This native method gets the caching for virtual memory, starting at the virtual address, base, and continuing for a length in bytes of len. One of the following values is to be returned:

CACHE_MODE_AMBIGUOUS—If the entire range is not cached the same way, or if none of the following return values apply.

CACHE_MODE_INHIBITED —If there is no cache, or if there is a cache, but this virtual memory range is now uncached.

CACHE_MODE_WRITE THROUGH—If this range of virtual memory is now cached in write-through mode.

CACHE_MODE_COPY_BACK—If this range of virtual memory is now cached in copy-back mode.

flushcache private native void flushcache(int vasid, long base, long len);

If any sub-range of this range of virtual memory is cached in CACHE_MODE_COPY_BACK mode, flush any such caches if possible. If it is not possible to flush them, convert them to CACHE_MODE_INHIBITED.

DMAAddressSpace

The DMAAddressSpace class defines the following native methods:

getAddressSize private native int getAddressSize( );

Returns the number of bits of DMA addresses alloc_id private native int alloc_id( );

Since it is assumed that there is only one DMA address space, the microkernel simply returns 0.

DMAMemory

The DMAMemory class defines the following native methods. Each of these native methods is implemented by functionality in the microkernel.

supported private native boolean supported( );

Returns true if DMA is supported on this platform; otherwise returns false.

physmap private native int physmap(long[ ] ret, long[ ] paddrs, longD sizes, long minaddr, long maxaddr, int align, boolean waitformem);

The physical memory to be mapped is specified via the arrays paddrs and sizes in such a way that the nth element of paddrs and the nth element of sizes specify the base physical address and length for a range of physical memory, respectively. These ranges of physical memory are to be mapped to increasingly higher DMA addresses in such a way that physical memory range n (as specified by nth elements of paddrs and sizes) is to be mapped to DMA addresses which are lower than the DMA addresses which map to physical memory range n+1. Furthermore, the DMA address ranges are to be contiguous, so that they form one DMA address range.

For this mapping, any range of DMA addresses can be used, except that all DMA addresses in the range must be greater than or equal to minaddr, and all DMA addresses in the range must be less than or equal to maxaddr. Also, the base DMA address is to be aligned as specified by align, which could have one of the following values:

MemoryConstraints.ALIGN_BYTE (0)—no alignment restriction.

MemoryConstraints.ALIGN_SHORT (1)—align to short.

MemoryConstraints.ALIGN_INT (2)—align to int.

MemoryConstraints.ALIGN_LONG (3)—align to long.

MemoryConstraints.ALIGN_CACHE (4)—align to cache line size.

MemoryConstraints.ALIGN_PAGE (5)—align to page size.

If waitformem is true and it is currently not possible to complete the mapping request, due to a resource running out temporarily, then wait indefinitely to complete the request. Otherwise, do not wait.

If not all these constraints can be met, but they could be met for a smaller sub-range, which must start with the first range of physical memory, then do the mapping for that smaller sub-range. For example, if this platform does not really have DVMA (Direct Virtual Memory Addressing), and if the physical memory ranges are discontigous, then obviously only the first range of physical memory can be mapped.

The base DMA address of the range is to be returned in ret[0] and the length of DMA memory mapped is to be returned in ret[1].

The possible return values are:

SUCCESS—The mapping was successful. Either the entire amount of physical memory was mapped, or at least a sub-range was mapped.

ADDRESS_FAILURE—There was some failure related to the physical addresses specified. For whatever reason those addresses are undefined physical memory or physical memory for which mappings can not be set up.

ALLOC_FAILURE—There was some other fatal failure in the attempt to create the mappings.

map private native int map(long[ ] ret, long size, long minaddr, long maxaddr, int align, boolean waitformem);

The amount of DMA memory to allocate is specified by size in bytes. For this mapping, any range of DMA addresses can be used, except that all DMA addresses in the range must be greater than or equal to minaddr, and all DMA addresses in the range must be less than or equal to maxaddr. Also, the base DMA address is to be aligned as specified by align, which could have one of the following values:

MemoryConstraints.ALIGN_BYTE (0)—no alignment restriction.

MemoryConstraints.ALIGN_SHORT (1)—align to short.

MemoryConstraints.ALIGN_INT (2)—align to int.

MemoryConstraints.ALIGN_LONG (3)—align to long.

MemoryConstraints.ALIGN_CACHE (4)—align to cache line size.

MemoryConstraints.ALIGN_PAGE (5)—align to page size.

If waitformem is true and it is currently not possible to complete the mapping request, due to a resource running out temporarily, then wait indefinitely to complete the request. Otherwise, do not wait.

If not all these constraints can be met, but they could be met for a smaller sub-range, which must start with the first range of physical memory, then do the mapping for that smaller sub-range.

The base DMA address of the range is to be returned in ret[0] and the length of DMA memory mapped is to be returned in ret[1].

The possible return values are:

SUCCESS—The mapping was successful. Either the entire amount of physical memory was mapped, or at least a sub-range was mapped.

ADDRESS_FAILURE—There was some failure related to the physical addresses specified. For whatever reason those addresses are undefined physical memory or physical memory for which mappings can not be set up.

ALLOC_FAILURE—There was some other fatal failure in the attempt to create the mappings.

unmap private native int unmap(long base, long len);

The DMA memory to be unmapped is that starting at base and having a length of len in bytes.

The possible return values are:

SUCCESS—The unmapping was a success. The entire range specified was unmapped.

ALLOC_FAILURE—There was some other fatal failure in the attempt to do the unmapping.

getphys private native int getphys(int[ ] ret, long[ ] pBase, long[ ] pLen, long base, long len);

The base of the range of DMA memory is specified by base, and the length of the range by len in bytes.

The physical memory is to be specified in the supplied arrays pBase and pLen, such that the pBase[0] and pLen[0] are the base and length of the physical memory that starts mapping the beginning of the DMA memory, and such that (pBase[n+1], pLen[n+1]) specifies physical memory to which a higher range of DMA addresses is mapped than the range of DMA addresses that map the physical memory range specified by (pBase[n], pLen[n]).

It is not possible for the caller to know how many discontignous ranges of physical memory map this DMA memory range, so it is possible that the supplied arrays for pBase and pLen may be too small. If this is the case, the microkernel is to return ARRAY_TOO_SMALL and specify the number of elements needed in the array in ret[0].

If this call is successful, the number of bits of the physical memory on this platform is specified in ret[1].

AccessibleMemory Sub-Classes

The various non-abstract sub-classes of AccessibleMemory define as native methods the methods abstracted in AccessibleMemory. These sub-classes consist of SwappedVirtualIOMemory, UnSwappedVirtualIOMemory, SwappedVirtualRegularMemory, UnSwappedVirtualRegularMemory, SwappedPortIOMemory, and UnSwappedPortIOMemory. For each of these sub-classes there are separate versions of these native methods.

These separate versions of native methods are mostly similar to one another, with their differences specified by the following flavors:

Swapped/UnSwapped—Versions of the native methods for swapped classes (SwappedVirtualIOMemory SwappedVirtualRegularMemory and SwappedPortIOMemory) must byte-swap (reverse the endianness) any data they get from the native methods before operating upon it, and must byte-swap back any data they supply to the classes. The other classes (UnSwappedVirtualIOMemory, UnSwappedVirtualRegularMemory, and UnSwappedPortIOMemory) are not to have any such byte-swapping done.

IO/Regular—Classes supporting IO memory (SwappedVirtualIOMemory and UnSwappedVirtualIOMemory) may require special platform-specific (implementation dependent) operations to be done whenever accesses are done to that memory. Classes supporting regular RAM memory (SwappedVirtualRegularMemory and UnSwappedVirtualRegularMemory) do not require any such special platform-specific operations. Note that on some platforms, there is no difference.

VirtualPort—Classes for virtual memory (SwappedVirtualIOMemory, UnSwappedVirtualIOMemory, SwappedVirtualRegularMemory and UnSwappedVirtualRegularMemory) can assume that memory is accessed via normal load and store instructions, and that the addresses specified in the native methods refer to virtual memory addresses. Classes for port memory (SwappedPortIOMemory and UnSwappedPortIOMemory) must do special I/O instructions to access memory.

Modulo the above specification of flavors, the following is specified for each of these six sets of native methods:

supported protected native boolean supported( );

Returns true if this particular sub-class of AccessibleMemory is supported on this platform; otherwise returns false.

ncksum protected native int ncksum(long adr, long len);

Computes a sum of the bytes of the memory (modulo 0x10000) starting at the address adr for the length len in bytes.

nSetByte protected native void nsetByte(long adr, byte x);

This operation must be done with respect to the following particular flavors (see above) of the specific subclass of AccessibleMemory which this native method supports: IO/Regular, Virtual/Port.

The byte value, x, is to be written at the address, adr.

nSetShort protected native void nsetshort(long adr, short x);

This operation must be done with respect to the following particular flavors (see above) of the specific sub-class of AccessibleMemory which this native method supports: Swapped;UnSwapped, IO/Regular, Virtual/Port.

The short value, x, is to be written at the address, adr.

nSetInt protected native void nSetInt(long adr, int x);

This operation must be done with respect to the following particular flavors (see above) of the specific sub-class of AccessibleMemory which this native method supports: Swapped/UnSwapped, IO/Regular, Virtual/Port.

The int value, x, is to be written at the address, adr.

nSetLong protected native void nsetLong(long adr, long x);

This operation must be done with respect to the following particular flavors (see above) of the specific sub-class of AccessibleMemory which this native method supports: Swapped/UnSwapped, IO/Regular, Virtual/Port.

The long value, x, is to be written at the address, adr.

nSetBytes protected native void nsetBytes(long adr, byte bytes[ ], int bytesOffset, int length);

This operation must be done with respect to the following particular flavors (see above) of the specific sub-class of AccessibleMemory which this native method supports: Swapped/UnSwapped, IO/Regular, Virtual/Port.

Starting at the offset, bytesOffset, of the array, bytes, the array of bytes is to be written starting at the address adr, for a total length in bytes of length.

nSetIntArmy protected native void nSetIntArray(long adr, byte bytes[ ], int bytesoffset, int length_int);

This operation must be done with respect to the following particular flavors (see above) of the specific sub-class of AccessibleMemory which this native method supports: Swapped/UnSwapped, IO/Regular, Virtual/Port.

Starting at the offset, bytesOffset, of the array, bytes, the array of bytes is to be written, treating it as an array of integers, starting at the address adr, for a total length in integers of length_int.

nGetByte protected native byte nGetByte(long adr);

This operation must be done with respect to the following particular flavors (see above) of the specific sub-class of AccessibleMemory which this native method supports: IO/Regular, Virtual/Port.

Read and return a byte from the address, adr.

nGetShort protected native short nGetshort(long adr);

This operation must be done with respect to the following particular flavors (see above) of the specific sub-class of AccessibleMemory which this native method supports: Swapped/UnSwapped, IO/Regular, Virtual/Port.

Read and return a short from the address, adr.

nGetInt protected native int nGetInt(long adr);

This operation must be done with respect to the following particular flavors (see above) of the specific sub-class of AccessibleMemory which this native method supports: Swapped/UnSwapped, IO/Regular, Virtual/Port.

Read and return an int from the address, adr.

nGetLong protected native long nGetLong(long adr);

This operation must be done with respect to the following particular flavors (see above) of the specific sub-class of AccessibleMemory which this native method supports: Swapped/UnSwapped, IO/Regular, Virtual/Port.

Read and return a long from the address, adr.

nGetBytes protected native void nGetBytes(long adr, byte bytes[ ], int bytesOffset, int length);

This operation must be done with respect to the following particular flavors (see above) of the specific sub-class of AccessibleMemory which this native method supports: Swapped/UnSwapped, IO/Regular, Virtual/Port.

Start reading bytes from adr for a total of length bytes, and read them into the array bytes, starting at the offset of bytesoffset of that array.

nGetIntArray protected native void nGetIntArray(long adr, byte bytes[ ], int bytesOffset, int length_int);

This operation must be done with respect to the following particular flavors (see above) of the specific sub-class of AccessibleMemory which this native method supports: Swapped/UnSwapped, IO/Regular, Virtual/Port.

Start reading ints from adr for a total of lengthjnt ints, and read them into the array bytes, starting at the offset of bytesoffset of that array.

nRegisterSource protected native void nRegisterSource(long adr1, long len);

This operation registers the source of a copy operation, and returns an ID, which can later be passed to the nCopy native method. The base address of the source, adr1, and the length in bytes to copy, len, are to be registered. It is also necessary to take into account and register the following flavors depending upon the particular nature of the source memory: Swapped/UnSwapped, IO/Regular, Virtual/Port.

nCopy protected native void nCopy(long adr2, long len, int copyID);

This operation performs a copy from the source as specified by copyID, to the destination specified here.

If copyID does not correspond to a registered source, do nothing.

The destination address, adr2, and length in bytes, len, are as specified. The source address and length may be obtained by what was registered for the source, as specified by copyID. If the length of source and destination do not agree, use the lesser of the two.

In performing this copy, it is necessary to take into account the following flavors for both the source and destination: Swapped/UnSwapped, IO/Regular, Virtual/Port.

The classes described above are stored on a computer readable medium, such as floppy disks, a CD-ROM, or optical disk. Alternatively, they are supplied to computer system 10 in a read-only memory, or provided in the form of a computer data carrier wave over a network.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing memory functionality to platform-independent object-oriented Java-based client software components operating on a computer system having a CPU and a native operating system, comprising the steps of:

providing a first set of Java-based memory classes, each class of the first set being platform-independent;

providing a second set of Java-based memory classes, each class of the second set being a subclass of a class of the first set and being platform-dependent;

performing client component memory functions for the Java-based client software by accessing only objects of classes of the first set;

performing platform-dependent memory functions using objects of second set of memory classes to access native memory functions implemented in the operating system of the native machine; and wherein the first and second set of Java-based memory classes are not implemented in the operating system of the native machine.

2. A method as recited in claim 1, wherein the step of providing a first set of memory classes includes the substep of providing a first abstract memory class having only the attributes of base address, length, and constraints.

3. A method as recited in claim 2, wherein the step of providing a first set of memory classes includes the substep of providing a first instantiable class of memory which extends the first abstract memory class and which provides no functionality beyond that provided by the first abstract memory class.

4. A method as recited in claim 3, wherein the step of providing a first set of memory classes includes the substep of providing a second abstract memory class which extends the first abstract memory class and which specifies only abstract methods for controlling cache memory.

5. A method as recited in claim 4, wherein the step of providing a first set of memory classes includes the substep of providing a third abstract memory class extending the second abstract memory class and representing all memory that can be directly accessed by the CPU.

6. A method as recited in claim 5, wherein the third abstract memory class defines platform-independent abstract methods for accessing memory.

7. A method as recited in claim 6, wherein the step of providing a second set of memory classes includes the substep of providing a second instantiable memory class, extending the second abstract memory class, which represents physical memory.

8. A method as recited in claim 7, wherein the second instantiable memory class provides implementations of cache management methods abstracted in the second abstract memory class.

9. A method as recited in claim 8, wherein the step of providing a second set of memory classes includes the substep of providing a fourth abstract memory class, which extends the third abstract memory class, and which contains methods for setting up mappings to objects of the second instantiable memory class and a method for allocating a specific amount of virtual memory without specifying a particular physical memory.

10. A method as recited in claim 9, wherein the step of providing a second set of memory classes includes the substep of providing a third instantiable memory class, which extends the first abstract memory class, for setting up DMA mapping to physical memory and for doing corresponding unmapping.

11. A method as recited in claim 1, wherein the step of providing a second set of memory classes includes methods that are separated into two groups, the first group being written in non-native language and the second group being written in native language.

12. A method as recited in claim 11, wherein the step of providing a second set of memory classes includes the substep of providing the second group of methods in a library of functions which access a microkernel of the computer system.

13. A method as recited in claim 1,
wherein the method further comprises defining a first abstract memory class; and
wherein the step of providing a first set of memory classes includes the substep of providing a second abstract memory class which extends the first abstract memory class and which specifies only abstract methods for caching memory; and
wherein the step of providing a second set of memory classes includes the substep of providing native methods corresponding to abstract cache management methods defined in the second abstract memory class.

14. Apparatus for performing memory functions in an object-oriented computer system, comprising:
a first set of Java-based memory classes, each class of the first set being platform-independent;
a second set of memory classes, each class of the second set being a subclass of a class of the first set and being platform-dependent;
a device driver accessing only objects of classes of the first set;
a bus manager accessing classes of the second set; and
wherein the first and second set of Java-based memory classes are not implemented in the operating system of the computer system.

15. A computer-readable medium containing instructions for providing memory functionality to Java-based object-oriented client software components of a computer system having a CPU, comprising:
computer instructions for a first set of Java-based memory classes, each class of the first set being platform-independent;
computer instructions for a second set of memory classes, each class of the second set being a subclass of a class of the first set and being platform-dependent;
computer instructions for performing platform-dependent memory functions using objects of second set of memory classes; and
wherein the first and second set of Java-based memory classes are not implemented in the operating system of the computer system.

16. A computer-readable medium as in claim 15, wherein the second set of classes includes a first subset of methods written in a platform-independent language and a second subset of methods written in native code.

* * * * *